(12) United States Patent
Brajon et al.

(10) Patent No.: US 12,332,051 B2
(45) Date of Patent: Jun. 17, 2025

(54) MAGNETIC POSITION SENSOR SYSTEM WITH HIGH ACCURACY

(71) Applicant: Melexis Technologies SA, Bevaix (CH)

(72) Inventors: Bruno Brajon, Bevaix (CH); Bernhard Kleiner, Dresden (DE)

(73) Assignee: MELEXIS TECHNOLOGIES SA, Bevaix (CH)

( * ) Notice: Subject to any disclaimer, the term of this patent is extended or adjusted under 35 U.S.C. 154(b) by 97 days.

(21) Appl. No.: 18/170,268

(22) Filed: Feb. 16, 2023

(65) Prior Publication Data

US 2023/0273007 A1 Aug. 31, 2023

(30) Foreign Application Priority Data

Feb. 25, 2022 (EP) .................................. 22159028

(51) Int. Cl.
*G01B 7/30* (2006.01)
*G01D 5/14* (2006.01)

(52) U.S. Cl.
CPC ............. *G01B 7/30* (2013.01); *G01D 5/145* (2013.01)

(58) Field of Classification Search
CPC ........ G01R 27/00; G01R 27/02; G01R 27/26; G01R 27/2605; G01D 5/00; G01D 5/12; G01D 5/14; G01D 5/142; G01D 5/145; G01D 5/244; G01D 5/24428; G01D 5/24433; G01D 5/24438; G01D 5/245; G01D 5/2451; G01B 7/00; G01B 7/30
USPC .................... 324/200, 207.11, 207.13, 207.2
See application file for complete search history.

(56) References Cited

U.S. PATENT DOCUMENTS

| | | | |
|---|---|---|---|
| 11,614,343 B2 * | 3/2023 | Schott | G01D 5/145 324/252 |
| 2010/0156400 A1 | 6/2010 | Noguchi et al. | |
| 2018/0231399 A1 | 8/2018 | Okumura et al. | |
| 2018/0231402 A1 | 8/2018 | Okumura et al. | |
| 2019/0049230 A1 | 2/2019 | Kurosawa et al. | |

(Continued)

FOREIGN PATENT DOCUMENTS

| | | |
|---|---|---|
| EP | 1818659 A1 | 8/2007 |
| EP | 1873534 A2 | 1/2008 |
| EP | 3885778 A1 | 9/2021 |

OTHER PUBLICATIONS

Partial European Search Report from corresponding EP Application No. EP 22159028.4, Jul. 26, 2022.

(Continued)

*Primary Examiner* — Hoai-An D. Nguyen
(74) *Attorney, Agent, or Firm* — Workman Nydegger

(57) ABSTRACT

A position sensor system includes a magnetic source and a sensor device movable relative to the magnetic source. The magnetic source has a first track of alternating magnetic poles, and a second track of an equal number of alternating poles, but 180° phase shifted relative to the first track. The sensor device is configured for measuring a plurality of magnetic field components, including a first magnetic field component at a first sensor location facing the first track, and a second magnetic field component oriented parallel to the first magnetic field component at a second sensor location facing the second track, and for deriving a first and a second difference signal from the plurality of magnetic field components, and for determining a position based on these difference signals.

14 Claims, 12 Drawing Sheets

(56) References Cited

U.S. PATENT DOCUMENTS

2021/0023697 A1  1/2021  Watanabe
2022/0001924 A1  1/2022  Padar et al.

OTHER PUBLICATIONS

Extended European Search Report from corresponding EP Application No. EP 22159028.4, Oct. 26, 2022.
Extended European Search Report from corresponding EP Application No. 23154455.2, May 26, 2023.

* cited by examiner

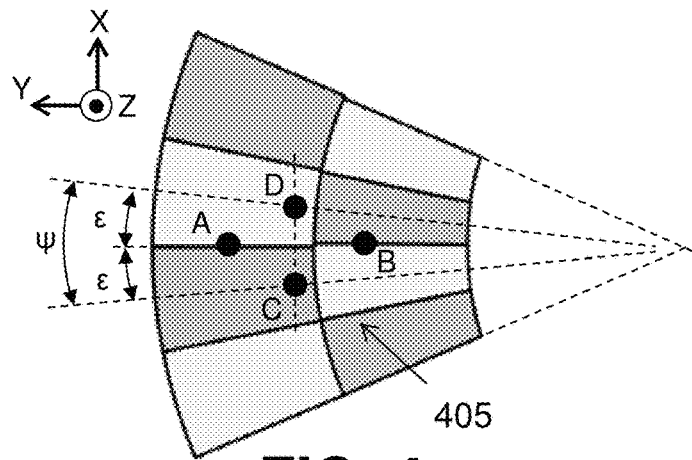
FIG. 4
e.g. ε=1/2 pole pitch or 90° electr
e.g. ψ = 1 pole pitch
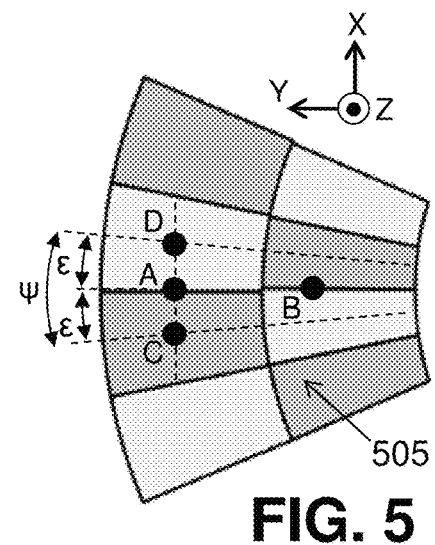
FIG. 5
same formulas as FIG. 4
e.g. ψ = 1 pole pitch
Example 4A:
diff1=(BzA−BzB) ~cos
diff2=(BzC−BzD) ~sin
Example 4B:
diff1=(BxA−BxB) ~cos
diff2=(BxC−BxD) ~sin
Processing:
R=diff1/diff2
φ=arctan(R)              [1], or
φ=arctan(K*R),           [2], or
φ=arctan(R/M±T)          [3]
optional: post-processing
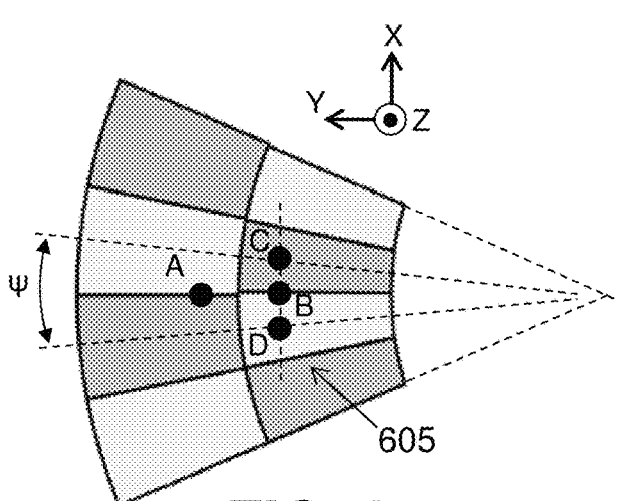
FIG. 6
same formulas as FIG. 4
e.g. ψ = 1 pole pitch
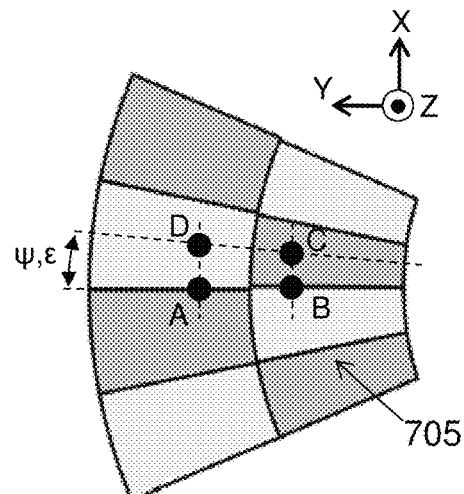
FIG. 7
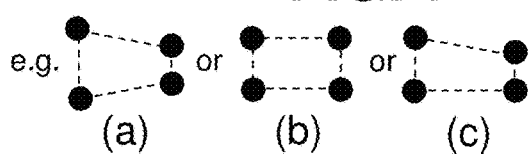
e.g. ε=90° electr
e.g. ψ = 1/2 pole pitch
same formulas as FIG. 4

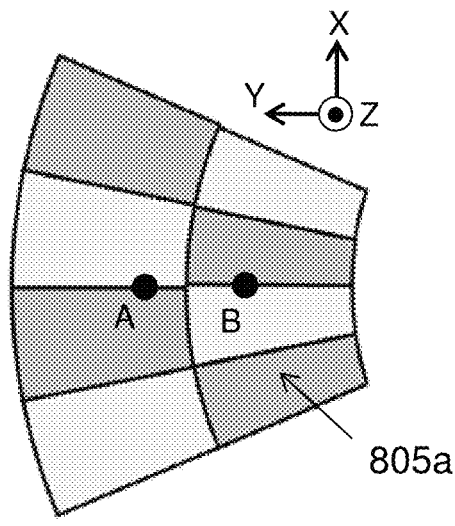
FIG. 8A
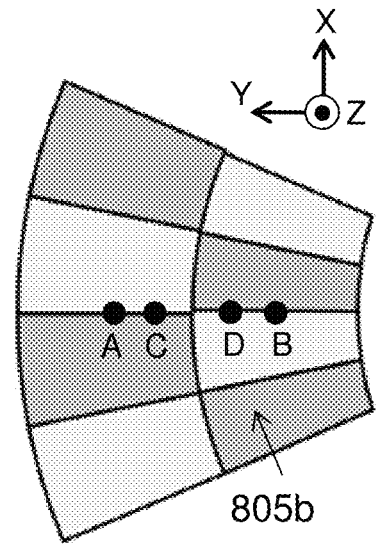
FIG. 8B
diff1=(BxA-BxB) ~cos
diff2=(BzA-BzB) ~sin
R=diff1/diff2
φ=arctan(R)      [1], or
φ=arctan(K*R)    [2],
optional: post-processing
diff1=(BxA-BxB) ~cos
diff2=(BzC-BzD) ~sin
or:
diff1=(BzA-BzB) ~cos
diff2=(BxC-BxD) ~sin
R=diff1/diff2
φ=arctan(R)      [1], or
φ=arctan(K*R)    [2],
optional: post-processing
FIG. 8 e.g. ω = 1/3 pole pitch or 120° electr
e.g. ψ = 2/3 pole pitch

Example 10A:
Bzavg=(BzA+BzB+BzC)/3
diff1=(BzA-Bzavg)
diff2=(BzB-Bzavg)
diff3=(BzC-Bzavg)

Example 10B:
Bxavg=(BxA+BxB+BxC)/3
diff1=(BxA-Bxavg)
diff2=(BxB-Bxavg)
diff3=(BxC-Bxavg)

Clarke Transformation => Q,I
R=Q/I
φ=arctan(R)
optional: post-processing same formulas as FIG. 9
e.g. ψ = 2/3 pole pitch

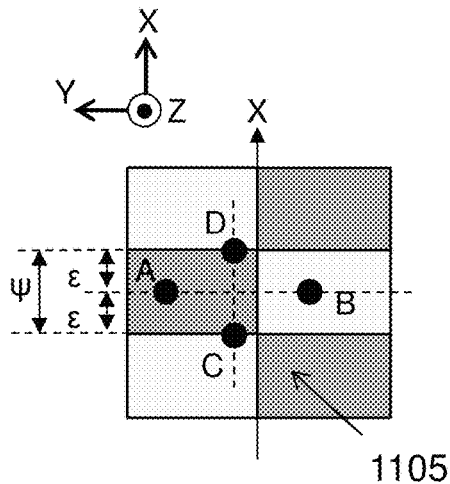

FIG. 11

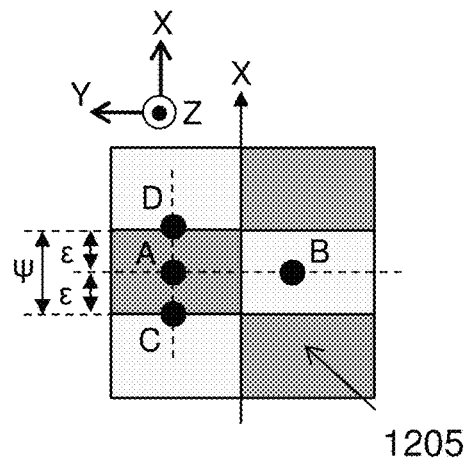

FIG. 12 e.g. $\varepsilon = 1/2$ pole pitch, or 90° electr
e.g. $\psi = 1$ pole pitch

Example 12A:
diff1=(BzA−BzB) ~cos
diff2=(BzC−BzD) ~sin case 12B:
diff1=(BxA−BxB) ~cos
diff2=(BxC−BxD) ~sin R=diff1/diff2
$\varphi$=arctan(R)          [1], or
$\varphi$=arctan(K*R)        [2], or
$\varphi$=arctan(R/M±T)     [3]
optional: post-processing
X=L*$\varphi$               [4]

e.g. $\varepsilon = 1/2$ pole pitch, or 90° electr
e.g. $\psi = 1$ pole pitch

Example 13A:
diff1=(BzA−BzB) ~cos
diff2=(BzC−BzD) ~sin case 13B:
diff1=(BxA−BxB) ~cos
diff2=(BxC−BxD) ~sin R=diff1/diff2
$\varphi$=arctan(R)          [1], or
$\varphi$=arctan(K*R)        [2], or
$\varphi$=arctan(R/M±T)     [3]
optional: post-processing
X=L*$\varphi$               [4]

e.g. ε=1/2 pole pitch, or 90° electr
e.g. ψ = 1/2 pole pitch

Example 14A:
diff1=(BzA-BzB) ~cos
diff2=(BzC-BzD) ~sin case 14B:
diff1=(BxA-BxB) ~cos
diff2=(BxC-BxD) ~sin R=diff1/diff2
φ=arctan(R)         [1], or
φ=arctan(K*R)       [2], or
φ=arctan(R/M±T)     [3]
optional: post-processing
X=L*φ               [4]

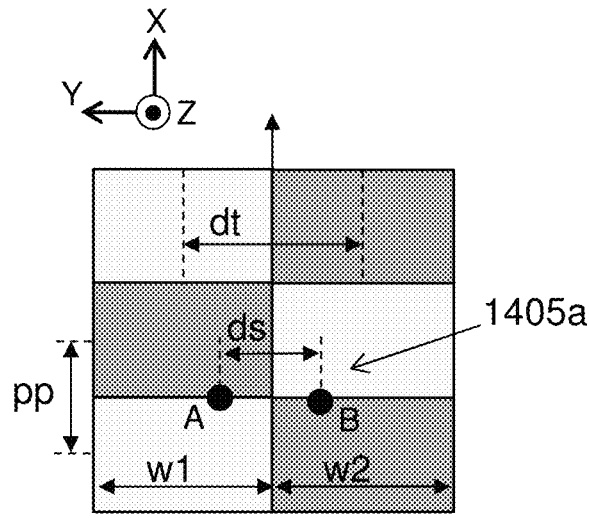
FIG. 14A
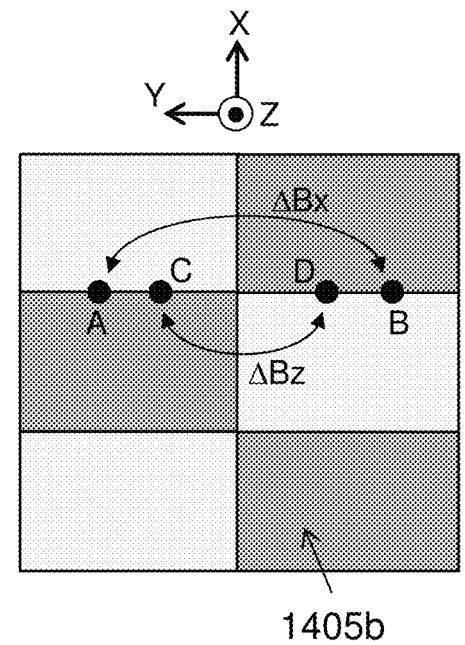
FIG. 14B
"ds" independent of "dt", and
"ds" independent of "pp"
diff1=(BxA−BxB) ~cos
diff2=(BzA−BzB) ~sin
R=diff1/diff2
φ=arctan(R)           [1], or
φ=arctan(K*R)      [2],
optional: post-processing
X=L*φ                     [4]
diff1=(BxA−BxB) ~cos
diff2=(BzC−BzD) ~sin
or:
diff1=(BzA−BzB) ~cos
diff2=(BxC−BxD) ~sin
R=diff1/diff2
φ=arctan(R)           [1], or
φ=arctan(K*R)      [2],
optional: post-processing
X=L*φ                     [4]
FIG. 14

Example 17A:
Bzavg=(BzA+BzB+BzC)/3
diff1=(BzA-Bzavg)
diff2=(BzB-Bzavg)
diff3=(BzC-Bzavg)

Example 17B:
Bxavg=(BxA+BxB+BxC)/3
diff1=(BxA-Bxavg)
diff2=(BxB-Bxavg)
diff3=(BxC-Bxavg)

Clarke Transformation => Q,I
R=Q/I
φ=arctan(R)        [1]
optional: post-processing
X=L*φ              [4]

MAGNETIC POSITION SENSOR SYSTEM WITH HIGH ACCURACY

FIELD OF THE INVENTION

The present invention relates in general to the field of magnetic position sensor systems, and more in particular to a linear or an angular position sensor system.

BACKGROUND OF THE INVENTION

Magnetic position sensor systems, in particular, linear or angular position sensor systems are known in the art. They offer the advantage of being able to measure a linear or an angular position without making physical contact, thus avoiding problems of mechanical wear, scratches, friction, etc.

Many variants of position sensor systems exist, addressing one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made.

There is always room for improvements or alternatives.

SUMMARY OF THE INVENTION

It is an object of embodiments of the present invention to provide a position sensor system which is highly insensitive to an external disturbance field.

It is an object of embodiments of the present invention to provide a position sensor system with an improved accuracy (e.g. having an increased sensitivity and/or an increased resolution).

It is an object of embodiments of the present invention to provide a position sensor system which is suitable for use in an industrial, robotic or automotive environment.

It is an object of embodiments of the present invention to provide a position sensor system, wherein the cost of the position sensor device is reduced (e.g. smaller chip area).

It is an object of embodiments of the present invention to provide a position sensor system, wherein the mounting requirements of the sensor device are relaxed.

It is an object of embodiments of the present invention to provide a position sensor system, that is more robust against ageing effects, (e.g. related to misalignment, mechanical wear, temperature variations, demagnetization, etc.).

These and other objectives are accomplished by embodiments of the present invention.

According to a first aspect, the present invention provides a position sensor system for determining a position (e.g. φ, x) of a sensor device movable along a predefined path relative to a magnetic source, or vice versa, the position sensor system comprising: said magnetic source comprising a first plurality (e.g. N1) of alternating magnetic poles arranged along a first track, and comprising a second plurality (e.g. N2) of alternating magnetic poles arranged along a second track, wherein centres of the magnetic poles are spaced apart by a predefined (e.g. linear or angular or circumferential) pole pitch (e.g. pp); wherein a centreline (e.g. C1) of the first track (e.g. T1) is spaced from a centreline (e.g. C2) of the second track (e.g. T2) by a predefined track distance (e.g. dt), and wherein the magnetization of the first track (e.g. T1) and the magnetization of the second track (e.g. T2) are substantially 180° phase shifted; and wherein the second plurality (e.g. N2) is equal to the first plurality (e.g. N1); wherein the sensor device comprises a plurality of magnetic sensors spanning a distance (or spaced apart over a distance) along the predefined path which is smaller than 1.40 times the pole pitch; wherein the plurality of magnetic sensors are configured for measuring a plurality of magnetic field components, including a first magnetic field component (e.g. BxA, BzA) at a first sensor location (e.g. A) located above the first track (e.g. T1) but preferably not above the second track, and a second magnetic field component (e.g. BxB, BzB) parallel to the first magnetic field component at a second sensor location (e.g. B) located above the second track (e.g. T2) but preferably not above the first track; the sensor device being further configured for deriving a plurality of difference signals (e.g. diff1, diff2) from said plurality of magnetic field components, and for deriving said position from said plurality of difference signals (e.g. diff1, diff2).

The plurality of difference signals is preferably linearly independent from each other.

Or stated in other words: a first imaginary line passing through the first sensor element and oriented perpendicular to the surface (e.g. planar or cylindrical surface) formed by the first and the second track, intersects the first track. Likewise, a second imaginary line passing through the second sensor element and oriented perpendicular to said surface intersects the second track.

The "predefined path" may also be referred to as the "path of relative movement".

It is a major advantage of such a system that the first and second difference signal are highly insensitive to an external magnetic disturbance field, and that therefore also the linear or angular position derived therefrom is highly insensitive to an external disturbance field.

It is an advantage that the first track and the second track are substantially 180° phase shifted, because such a magnet does not suffer from crosstalk between the tracks.

It is an advantage that the first and second sensor are located on the first and the second track, because these signals are phase shifted in a manner independent of the pole pitch (only dependent on the track width).

In some embodiments (see e.g. FIG. 4 to FIG. 8B and FIG. 10 to FIG. 14B) where the first and the second sensor signal are 180° phase shifted, a difference between these signals provides approximately twice the signal amplitude (thus improving signal-to-noise), and cancels out (or largely reduces) an external disturbance field.

In an embodiment, a maximum distance between the sensors along the predefined path, e.g. linear, angular or circumferential distance, is less than 1.40 times the pole pitch, or less than 1.30 times the pole pitch, or less than 1.20 times the pole pitch, or less than 1.10 times the pole pitch, or less than the 1.00 times the pole pitch, or less than 0.90 times the pole pitch, or less than 0.75 times the pole pitch, or less than 0.60 times the pole pitch, or less than 0.40 times the pole pitch.

In an embodiment, a maximum distance between the sensors along the predefined path, e.g. linear, angular or circumferential distance, is equal to about 1.00 times the pole pitch (±5%), or equal to about 0.67 times the pole pitch (±5%), or equal to about 0.50 times the pole pitch (±5%).

The predefined path may for example have a length of at least 5.0 mm or at least 10 mm. The path may for example be a straight line longer than 5 mm or longer than 10 mm, or a circular path with a radius larger than 3.0 mm, or larger than 4.0 mm.

The position sensor system may be an angular position sensor system, or a linear position sensor system.

In an embodiment, the number of North poles and South poles facing the sensor device is at least four North poles and four South poles, or at least six North poles and six South poles, or at least eight North poles and eight South poles, or at least ten North poles and ten South poles, or at least twelve North poles and twelve South poles, or at least sixteen North poles and sixteen South poles, or at least twenty North poles and twenty South poles.

Preferably the first and the second sensor location (A, B) are located on a virtual line segment substantially perpendicular to the predefined path, e.g. located on a line segment transverse to the direction of movement in case of a linear position sensor system, or located on a radially oriented line segment in case of an angular position sensor system.

The second track may be adjacent the first track. There may be a groove between the first track and the second track.

The magnetic poles of the first track (T1) have a predefined (linear or angular) pole pitch, and the magnetic poles of the second track (T2) have the same predefined pole pitch.

In an embodiment, said plurality of difference signals comprises at least one difference determined between a first signal measured at the first sensor location (e.g. A) above the first track (e.g. T1) and a second signal measured at the second sensor location (e.g. B) above the second track (e.g. T2).

In an embodiment, the predefined path is linear, and the first track is linear, and the second track is linear.

Such a position sensor system can be referred to as a "linear position sensor system".

The predefined path, the centreline of the first track and the centreline of the second track are preferably parallel to each other.

In an embodiment, each of the first and the second track comprises at least two magnetic pole pairs (two poles facing up, two poles facing down), or at least three magnetic pole pairs, or at least four magnetic pole pairs, or at least five magnetic pole pairs, or at least six magnetic pole pairs (e.g. as illustrated in FIG. 3).

In an embodiment, the first track and the second track have a circular or annular shape with a common centre, and the sensor device is located at a non-zero-distance from said centre.

Such a position sensor system can be referred to as an "angular position sensor system".

The predefined path, the centreline of the first track and the centreline of the second track are preferably located on concentric circles.

In an embodiment, each of the first and the second track comprises at least four magnetic pole pairs (e.g. two North poles and two South poles on the top surface, and two North poles and two South poles on the bottom surface), or at least six magnetic pole pairs, or at least eight magnetic pole pairs (e.g. as illustrated in FIG. 1), or at least ten or twelve or fourteen magnetic pole pairs, or at least sixteen magnetic pole pairs (e.g. as illustrated in FIG. 2).

In an embodiment, the magnetic source is rotatable about a rotation axis, and the first track and the second track are concentric circular tracks located in a single plane perpendicular to the rotation axis.

In this embodiment, the magnetic source may be magnetized in the axial direction, i.e. the remanent magnetic field may be parallel to the rotation axis. The substrate of the sensor device may be oriented perpendicular to the rotation axis.

In this embodiment, the first track T1 has a first, circular centerline with a first radius, and the second track T2 has a second, circular centerline with a second radius smaller than the first radius, and the difference between the first and the second radius is equal to the predefined track distance "dt".

The sensor device is preferably mounted at a distance in the range from 0.5 to 5.0 mm "above" the planar tracks.

In an embodiment, the magnetic source is rotatable about a rotation axis, and the first track and the second track are cylindrical tracks about said rotation axis, and are spaced apart in an axial direction of said rotation axis; wherein the first track has a first outer radius (e.g. R1), and the second track has a second outer radius (e.g. R2) equal to the first outer radius.

In this embodiment, the magnetic source may be magnetized in the radial direction, i.e. the remanent magnetic field may be perpendicular to the rotation axis.

The sensor device is preferably mounted at a distance in the range from 0.5 to 5.0 mm "above" the cylindrical tracks.

In an embodiment, the sensor device is further configured for measuring a third magnetic field component (e.g. BzC) at a third sensor location (e.g. C), and for measuring a fourth magnetic field component (e.g. BzD) at a fourth sensor location (e.g. D); wherein the first, second, third and fourth are four different sensor locations; and wherein the third and the fourth magnetic field component are oriented parallel or orthogonal to the first magnetic field component (e.g. BzA); and wherein the plurality of difference signals comprises a first difference signal (e.g. diff1) and a second difference signal (e.g. diff2), wherein the first difference signal (e.g. diff1) is a difference between the first (e.g. BzA) and the second (e.g. BzB) magnetic field component, and the second difference signal (diff2) is a difference between the third (e.g. BzC) and the fourth (e.g. BzD) magnetic field component.

Examples of this embodiment are shown in FIG. 4 to FIG. 7, and in FIG. 11 to FIG. 13.

It is an advantage if the first and the second difference signal are furthermore substantially 90° phase shifted, and if they have approximately the same amplitude, because in this case the linear or angular position can easily be calculated using an arctan function. This is not absolutely required, however, because it is possible to scale or both difference signals such that they have the same amplitude, and/or it is possible to use a so called "modified arctan function" if the two signals are not 90° phase shifted.

In an embodiment, the first and the second and the third and the fourth magnetic field component are oriented in parallel to the substrate (typically denoted as: Bx).

In an embodiment, the first and the second and the third and the fourth magnetic field component are oriented perpendicular to the substrate (typically denoted as: Bz).

In an embodiment, the first and the second magnetic field component are oriented in parallel to the substrate (typically denoted as: Bx), and the third and the fourth magnetic field component are oriented perpendicular to the substrate (typically denoted as: Bz), e.g. as shown in FIG. 14B.

In an embodiment, the sensor device comprises four horizontal Hall elements.

In an embodiment, the sensor device comprises four vertical Hall elements.

In an embodiment, the sensor device comprises a substrate, located at a predefined distance from the first track and the second track; and the first, second, third and fourth sensor locations are four different sensor locations (e.g. A, B, C, D); and the first, second, third and fourth magnetic field component (e.g. BzA, BzB, BzC, BzD) are oriented in a direction (e.g. Z) perpendicular to the substrate.

Examples of this embodiment are shown in FIG. 4 to FIG. 7, and in FIG. 11 to FIG. 13.

The substrate may be a semiconductor substrate. The sensor device may be encapsulated in a mould package and may have a plurality of pins (typically referred to as a "semiconductor chip".

The magnetic sensors or magnetic sensor elements may be incorporated in said substrate, or may be mounted to said substrate.

In an embodiment, the semiconductor device comprises only a single semiconductor substrate.

In an embodiment, the sensor device comprises four horizontal Hall elements, preferably not adjacent a magnetic flux concentrator (IMC).

In an embodiment, the sensor device comprises a substrate, located at a predefined distance from the first track and the second track; and the first, second, third and fourth sensor locations are four different sensor locations (e.g. A, B, C, D); and the first, second, third and fourth magnetic field component (e.g. BxA, BxB, BxC, BxD) are oriented in a direction (e.g. X) parallel to the substrate, and tangential to the predefined path of relative movement.

Examples of this embodiment are shown in FIG. 4 to FIG. 7, and in FIG. 11 to FIG. 13.

In an embodiment, the sensor device comprises four vertical Hall elements.

In an embodiment, the first sensor location (e.g. A) and the second sensor location (e.g. B) are located on a first line segment which is oriented substantially transversal to the predefined path; and the third sensor location (e.g. C) and the fourth sensor location (e.g. D) are located on a second line segment which is oriented orthogonal to the first line segment.

Such embodiments are illustrated in FIG. 4 to FIG. 6, and FIG. 11 and FIG. 12.

In an embodiment, the first sensor location (e.g. A) and the second sensor location (e.g. B) are located on a first line segment which is oriented substantially transversal to the predefined path; and the third sensor location (e.g. C) and the fourth sensor location (e.g. D) are located on a second line segment which is oriented substantially parallel to the first line segment.

Such embodiments are illustrated in FIG. 7, and FIG. 13.

In an embodiment, the first and the third sensor location (A, C) are spaced apart by substantially ½ pole pitch, and likewise, the second and the fourth sensor location (B, D) are spaced apart by substantially ½ pole pitch. In this case, an arctan-formula of the ratio R, optionally multiplied by a constant K may be used to determine the position.

In an embodiment, the first and the third sensor location (A, C) are spaced apart by a distance in the range from 20% to 45% of the pole pitch, and likewise, the second and the fourth sensor location (B, D) are spaced apart by a distance in the range from 20% to 45% of the pole pitch. In this case the arctan-formula [3] with constant C different from 1.0 and/or with constant T different from 0.0 may be used to determine the position.

In an embodiment, the first and the third sensor location (A, C) are spaced apart by a distance in the range from 55% to 80% of the pole pitch, and likewise, the second and the fourth sensor location (B, D) are spaced apart by a distance in the range from 55% to 80% of the pole pitch. In this case the arctan-formula [3] with constant C different from 1.0 and/or with constant T different from 0.0 may be used to determine the position.

In an embodiment, the first line segment and the second line segment coincide, meaning that the four sensor locations four different sensor locations which are located on a single line, e.g. as illustrated in FIG. 8B, or FIG. 14B.

In an embodiment, the first line segment and the second line segment are spaced apart by at least 0.5 mm.

In an embodiment, the sensor device is further configured for measuring a third magnetic field component (e.g. BxA) orthogonal to the first magnetic field component (e.g. BzA) at the first sensor location (e.g. A) or at a third sensor location (e.g. C) located on a virtual line passing through the first sensor location (e.g. A) and the second sensor location (e.g. B), and for measuring a fourth magnetic field component (e.g. BxB) orthogonal to the second magnetic field component (e.g. BzB) at the second sensor location (e.g. B) or at a fourth sensor location (e.g. D) located on said virtual line passing through the first sensor location (e.g. A) and the second sensor location (e.g. B); and the plurality of difference signals comprises a first difference signal (e.g. diff1) and a second difference signal (e.g. diff2), wherein the first difference signal (e.g. diff1) is a difference between the first (e.g. BzA) and the second (e.g. BzB) magnetic field component, and the second difference signal (e.g. diff2) is a difference between the third (e.g. BxA) and the fourth (e.g. BxB) magnetic field component.

Examples of this embodiment are shown in FIG. 8A and FIG. 14A.

The sensor device is preferably oriented such that a virtual line segment [AB] interconnecting the first and the second sensor location (A, B) is oriented substantially perpendicular to the predefined path.

It is a major advantage of this embodiment that there are only two sensor positions, the location of which are pole-pitch independent, meaning that a particular sensor chip can be used with a large variety of different magnets.

In an embodiment, the sensor device comprises two 2D-sensors, a first 2D sensor located at the first sensor location (A) above the first track (T1), and a second 2D sensor located at the second sensor location (B) above the second track (T2). Each 2D sensor may comprise an integrated magnetic flux concentrator and two horizontal Hall elements, e.g. as illustrated in FIG. 19, or may comprise a horizontal Hall elements and at least one vertical Hall element, e.g. as illustrated in FIG. 20.

In an embodiment, the plurality of difference signals comprises a first difference signal (e.g. diff1) and a second difference signal (e.g. diff2); and the position is determined as a function (e.g. an arctangent function) of the ratio of the first and the second difference signal.

In an embodiment, the position is determined in accordance with, or by making use of one of the following formulas: $\varphi=\arctan(R)$, or $\varphi=\arctan(K*R)$, or $\varphi=\arctan(R/M\pm T)$, where diff1 is the first difference signal, diff2 is the second difference signal, R is a ratio of the first and the second difference signal, and K and M are predefined constants different from 1.0, e.g. larger than 1.05 or smaller than 0.95; and wherein T is a predefined constants different from 0, e.g. having an absolute value larger than of at least 0.05.

The value of K may be different from 1.0, e.g. may be smaller than 0.95 or larger than 1.05. The value of M may be equal to 1.0 or may be different from 1.0. For example, the value of M may be smaller than 0.95 or larger than 1.05. The value of T may be equal to 0.0, or may be different from 0.0, for example be larger than 0.05 in absolute value. The value of K, M, T may be determined by simulation or by calibration, and may be hardcoded, or may be stored in a non-volatile memory of the sensor device.

In case of a linear position sensor system, the linear position may be calculated by multiplying the value of the value phi by a predefined constant (e.g. L) related to the pole pitch.

In an embodiment, the sensor device is further configured for measuring a third magnetic field component (e.g. BzC) parallel to the first magnetic field component (e.g. BzA) at a third sensor location (e.g. C); and the first and the second sensor location (e.g. A, B) are spaced apart by ⅓ pole pitch (such that the first and second signal are 240° phase shifted, since they are located on different tracks), and wherein the first and the third sensor location (e.g. A, C) are spaced apart by ⅔ pole pitch (such that the first and third signal are 120 phase shifted, since they are located on the same track); and wherein the sensor device is configured for: determining an average (e.g. Bzavg) of the first, the second and the third magnetic field component; and for determining a first difference signal (e.g. diff1) as a difference between the first magnetic field component (e.g. BzA) and said average (e.g. Bzavg); and for determining a second difference signal (e.g. diff2) as a difference between the second magnetic field component (e.g. BzB) and said average (e.g. Bzavg); and for determining a third difference signal (e.g. diff3) as a difference between the third magnetic field component (e.g. BzC) and said average (e.g. Bzavg); and for determining the position based on the first, the second and the third difference signal.

Examples of this embodiment are shown in FIG. 9, FIG. 10 and FIG. 15.

The three difference signals are "three phase signals", i.e. have substantially the same amplitude, and are substantially 120° phase shifted. It is known how to calculate the position based on three phase signals. In an embodiment, the three phase signals are converted into quadrature signals I, Q using the well-known Clarke transformation, and the position is determined as a function of a ratio of these quadrature signals, e.g. as an arctangent function of said ratio.

The magnetic source may be or may comprise a permanent magnet. The permanent magnet may comprise ferrite, or a compound material such as FeNi or Nickel-ferrite or may comprise be plastic bonded magnets.

The magnetic source may comprise an isotropic material or may comprise an anisotropic magnetic material.

In an embodiment, the magnetic material comprises or mainly comprises ferrite, SmCo, FeNdB, or plastic bonded magnets or plastic bonded magnetic powder.

In an embodiment, the first track (e.g. T1) has a first width (e.g. w1) in the range from 1.0 to 3.0 mm, or in the range from 1.5 to 2.5 mm; and wherein the second track (e.g. T2) has a second width (e.g. w2) in the range from 1.0 to 3.0 mm, or in the range from 1.5 to 2.5 mm; and wherein a distance (e.g. ds) between the first sensor location (e.g. A) and the second sensor location (e.g. B) is a value in the range from 1.0 mm to 3.0 mm, or in the range from 1.5 mm to 2.5 mm.

In an embodiment, the position sensor system is an angular position sensor system, and the magnetic source is mounted to a shaft, and wherein the sensor device is configured for determining a first angular value of the shaft; and wherein the position sensor system further comprises a two-pole magnet mechanically connected to said shaft, e.g. directly or indirectly (e.g. via a plurality of gears), and further comprises a second sensor device configured for determining a second angular position of the shaft; and wherein the position sensor system is further configured for combining the first angular position and the second angular position. It is an advantage that the combined position is a highly accurate value in a range of at least 360°.

In an embodiment, the plurality of magnetic sensors comprises only Hall sensors.

In an embodiment, the plurality of magnetic sensors comprises only Horizontal Hall sensors; or in an embodiment, the plurality of magnetic sensors comprises only Vertical Hall sensors; or in an embodiment, the plurality of magnetic sensors comprises at least one Horizontal Hall sensor and at least one Vertical Hall sensor.

In an embodiment, a distance (e.g. ds) between the first sensor location (e.g. A) and the second sensor location (e.g. B) is smaller than a sum of the width (e.g. w1) of the first track (e.g. T1) and the width (e.g. w2) of the second track (e.g. T2), or smaller than 80% of said sum, or smaller than 70% of said sum, or smaller than 60% of said sum, or smaller than 50% of said sum, or smaller than 40% of said sum.

In an embodiment, a distance (e.g. ds) between the first sensor location (e.g. A) and the second sensor location (e.g. B) is smaller than 2.00 times the track distance (e.g. dt), or smaller than 1.50 times the track distance (e.g. dt), or smaller than 1.25 times the track distance (e.g. dt), or smaller than 1.00 times the track distance (e.g. dt), or smaller than 0.90 times the track distance (e.g. dt).

According to a second aspect, the present invention also provides a position sensor device for use in a position sensor system according to the first aspect; the position sensor device comprising a substrate; the substrate comprising: a first magnetic sensor for measuring a first magnetic field component (e.g. BzA) at a first sensor position (e.g. A), and a second magnetic sensor for measuring a second magnetic field component (e.g. BzB) at a second sensor position (e.g. B), and a third magnetic sensor for measuring a third magnetic field component (e.g. BzC) at a third sensor position (e.g. C); wherein the first, the second and the third magnetic field component are parallel, and are oriented in a direction parallel (e.g. X) or perpendicular (e.g. Z) to the substrate; wherein the first, the second and the third magnetic sensor are located at the corners of a triangle having a first side and a second side which are equal in length, and having a third side which is at least 10% longer or at least 10% shorter than the first and the second side; the position sensor device further comprising a processing unit configured for determining an average (e.g. Bzavg) of the first and the second and the third magnetic field component, and for determining a first difference signal (e.g. diff1) as a difference between the first magnetic field component and the average, and a second difference signal (e.g. diff2) as a difference between the second magnetic field component and the average, and a third difference signal (e.g. diff3) as a difference between the third magnetic field component and the average; and for converting these three difference signals into quadrature signals (e.g. using a Clarke transformation), and for calculating an angular position based on these quadrature signals (e.g. using an arctangent function of a ratio of the quadrature signals).

In variant, the third side is at least 20% longer than the first and second side or is at least 20% shorter than the first and second side.

In case the three magnetic sensors are configured for measuring a magnetic field component parallel to the substrate (e.g. Bx), the magnetic sensors are preferably oriented such that their axis of maximum sensitivity is parallel to the third leg.

According to a third aspect, the present invention also provides a magnetic source comprising: a first plurality (e.g. N1) of alternating magnetic poles arranged along a first track (e.g. T1); a second plurality (e.g. N2) of alternating magnetic poles arranged along a second track (e.g. T2); wherein a centreline (e.g. C1) of the first track (e.g. T1) is spaced from a centreline (e.g. C2) of the second track (e.g. T2) by a predefined track distance (e.g. dt); and wherein a magnetization of the first track (e.g. T1) and a magnetization of the second track (e.g. T2) are substantially 180° phase shifted; and wherein the second plurality (e.g. N2) is equal to the first plurality (e.g. N1).

In an embodiment, the first track (e.g. T1) and the second track (e.g. T2) are circular tracks substantially located in a plane; and wherein the first track (e.g. T1) and the second track (e.g. T2) are concentric tracks; and where the first track (e.g. T1) and the second track (e.g. T2) are magnetized in a direction perpendicular to the plane.

In an embodiment, the first track (e.g. T1) and the second track (e.g. T2) are located on a cylindrical surface; and where the first track (e.g. T1) and the second track (e.g. T2) are magnetized in a direction perpendicular to the cylindrical surface.

In an embodiment, the first track (e.g. T1) and the second track (e.g. T2) are straight tracks located substantially in a plane; and wherein the first track (e.g. T1) and the second track (e.g. T2) are magnetized in a direction perpendicular to the plane.

Particular and preferred aspects of the present invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 4 to FIG. 10 show various sensor arrangements, as may be used in the sensor device of the angular position sensor system shown in FIG. 1.

FIG. 11 to FIG. 15 show various sensor arrangements, as may be used in the sensor device of the angular position sensor systems illustrated in FIG. 2, or in the linear position sensor system illustrated in FIG. 3.

Figure 1:
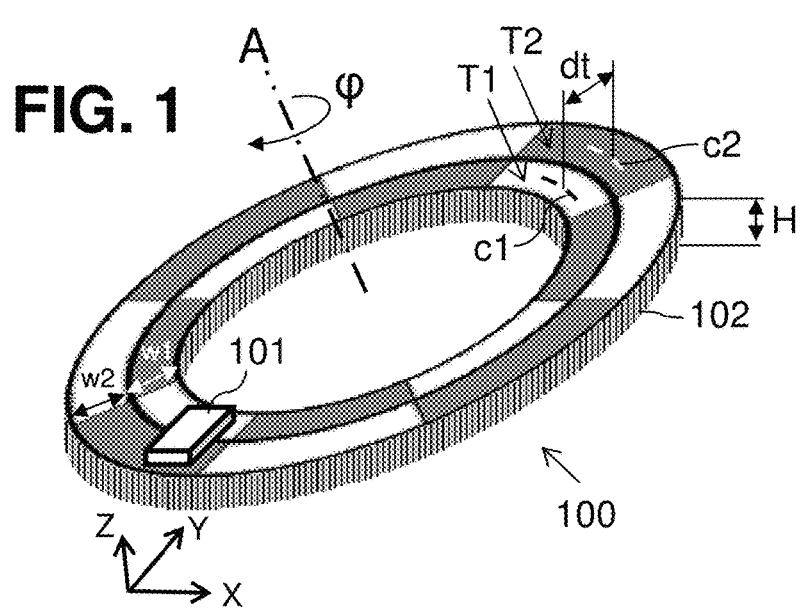
FIG. 1 shows an illustrative example of an angular position sensor system, according to an embodiment of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required. The sensor device preferably contains a semiconductor substrate.

In this document, the term "sensor element" or "magnetic sensor element" or "magnetic sensor" can refer to a component or a group of components or a sub-circuit or a structure capable of measuring a magnetic quantity, such as for example a magneto-resistive (MR) element, a GMR element, an XMR element, a horizontal Hall plate, a vertical Hall plate, a Wheatstone-bridge containing at least one (but preferably four) magneto-resistive elements, etc. or combinations hereof.

Figure 19:
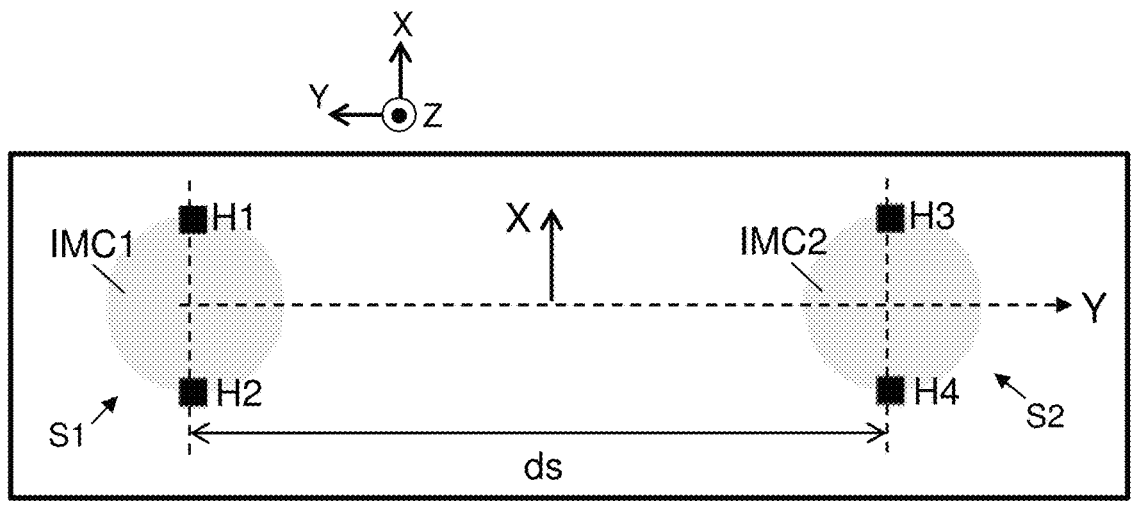
FIG. 19 shows an example of a sensor structure that may be used in the sensor arrangement of FIG. 8A and FIG. 14A.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other (e.g. as illustrated in FIG. 19), or an IMC with four horizontal Hall elements 90° spaced from each other (not shown).

In this document, the expression "in-plane component of a magnetic field vector" and "projection of the magnetic field vector in the sensor plane" mean the same. If the sensor device is or comprises a substrate, this also means "magnetic field component parallel to the substrate".

In this document, the expression "out-of-plane component of a vector" and "Z component of the vector" and "projection of the vector on an axis perpendicular to the sensor plane" mean the same.

In this document, the word "magnet", "magnetic structure" and "magnetic source" are used as synonyms.

Figure 2:
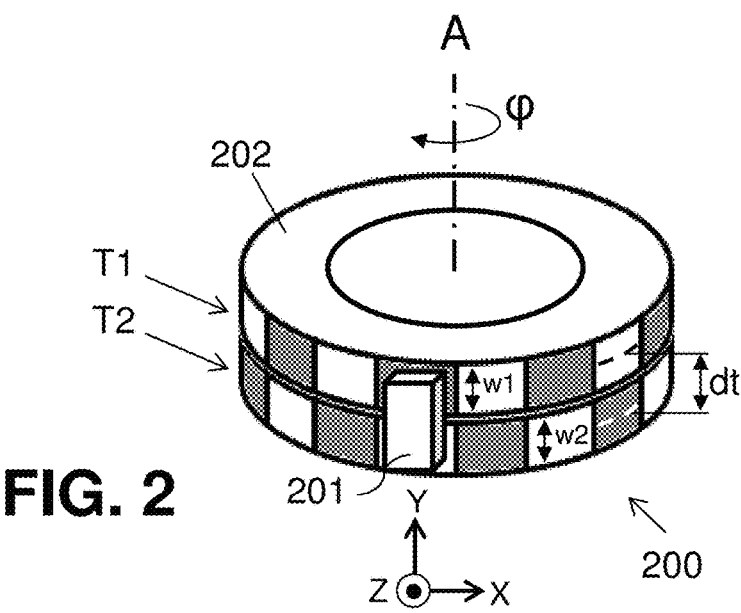
FIG. 2 shows an illustrative example of an angular position sensor system, according to another embodiment of the present invention.
Figure 3:
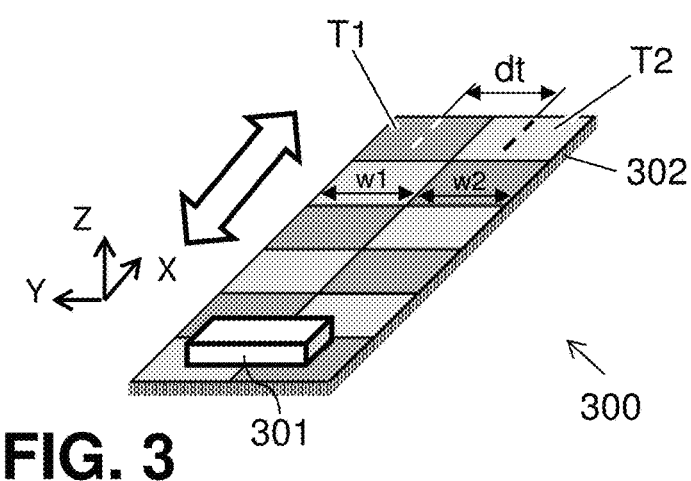
FIG. 3 shows an illustrative example of a linear position sensor system, according to an embodiment of the present invention.

Embodiments of the present invention are typically described using an orthogonal coordinate system which is fixed to the sensor device, and having three axes X, Y, Z, where the X and Y axis are parallel to the substrate, and the Z-axis is perpendicular to the substrate. Furthermore, the X-axis is preferably oriented "parallel to the direction of relative movement" in case of a linear position sensor system" (e.g. as illustrated in FIG. 3), or "tangential to the movement trajectory" in case of a curved movement trajectory, or in a "circumferential direction", i.e. tangential to an imaginary circle having a centre located on the rotation axis in case of an angular position sensor system comprising a rotatable magnet (e.g. as illustrated in FIG. 1 or FIG. 2). In case of an angular position sensor system, one of the other axes (Y or Z) is preferably oriented parallel to the rotation axis of the magnet.

In this document, the expression "spatial derivative" or "derivative" or "spatial gradient" or "gradient" are used as synonyms. In the context of the present invention, the gradient is typically determined as a difference between two values measured at two locations spaced apart in the X-direction. In theory the gradient is calculated as the difference between two values divided by the distance "dx" between the sensor locations, but in practice the division by "dx" is often omitted, because the measured signals need to be scaled anyway. Hence, in the context of the present invention, the magnetic field difference ($\Delta Bx$) and magnetic field gradient $dBx/dx$ are used interchangeably.

In this document, the term "magnitude of a magnetic field component By" means "the maximum of the absolute value of the By-signal over a full 360° (electrical) rotation of the magnet", and likewise for "amplitude of Bx" and "amplitude of Bz".

In this application, horizontal Hall plates are typically referred to by H1, H2, etc., signals from these horizontal Hall plates are typically referred to by h1, h2, etc.; vertical Hall plates are typically referred to by V1, V2, etc.; and signals from these vertical Hall plates are typically referred to by v1, v2, etc.

In the context of the present invention, the formulas $\arctan(x/y)$, $\mathrm{atan2}(x,y)$, $\mathrm{arccot}(y/x)$ are considered to be equivalent.

In this application, the expression "the sensor device is located at a certain axial and radial position", actually means that a central position of the sensors of that sensor device is located at the specified axial and radial position.

In this application, the term "track" as part of a magnetic source, typically refers to a ring-shaped or annular shaped or cylindrical shaped object when talking about an angular position sensor system for example as illustrated in FIG. 1 and FIG. 2, and typically refers to a beam-shaped object when talking about a linear position sensor system, for example as illustrated in FIG. 3.

The tracks of the magnetic source of FIG. 1, FIG. 2 and FIG. 3 have a "width" extending in the radial direction R, the axial direction A, and the transverse direction Y, respectively.

The term "centreline of a track" as used herein refers to a virtual line or curve, situated at the surface of the track, in the middle of the width. For example, in FIG. 1 the centreline is a circle having a radius equal to the average of the inner radius and the outer radius of the respective track; in FIG. 2 the centreline is a circle having a radius equal to the outer radius of the track, and situated halfway the width (in the axial direction); in FIG. 3 the centreline is the straight line in the middle of the track (halfway the transverse direction).

The expression "the tracks are spaced apart by a distance dt" as used herein means that the centrelines of the tracks are spaced by said the distance "dt".

The present invention relates to linear and angular position sensor systems comprising a magnetic source and a sensor device, movable relative to the magnetic source, and in particular to position sensor systems with high resolution (or high sensitivity) and high accuracy (or small error).

The present invention provides a position sensor system, e.g. a linear or angular position sensor system, comprising a magnetic source and a sensor device. The sensor device is movable relative to the magnetic source, or vice versa. The sensor device is configured for determining its position relative to the magnetic source.

According to an important aspect of the present invention, the magnetic source comprises two adjacent tracks (e.g. two concentric tracks or two parallel tracks) with an equal number of magnetic poles, organized in such a way that "adjacent poles" of the two tracks have opposite polarity. In the arrangement of FIG. 1 this means for example that a magnetic South pole of the inner track T1 is adjacent to a magnetic North pole of the outer track T2 at the same angular position φ. In the arrangement of FIG. 2 this means for example that a magnetic South pole of the upper track T1 is adjacent to a magnetic North pole of the lower track T2 at the same angular position φ. In the arrangement of FIG. 3 this means for example that a magnetic South pole of the left track T1 is adjacent to a magnetic North pole of the right track T2 at the same linear position X.

The sensor device comprises a plurality of magnetic sensors configured for measuring a plurality of magnetic field components, e.g. at least three magnetic field components (see e.g. FIG. 9, FIG. 10, FIG. 15) or at least four magnetic field components (see e.g. FIG. 4 to FIG. 8, or FIG. 11 to FIG. 14). At least a first one of these magnetic field components is measured at a first sensor location "A" facing or situated above or situated outside of the first track T1, and at least a second one of these magnetic field components is measured at a second sensor location "B" facing or situated above or situated outside the second track T2. The first and the second magnetic field component are oriented in parallel. Depending on the specific sensor configuration, a third and optionally a fourth magnetic field component may be measured above the first track T1 and/or above the second track T2, or the third component above the first track and the fourth component above the second track, and its/their orientation may be the same or different from that of the first magnetic field component.

The sensor device is further configured for deriving (e.g. calculating) a plurality of (e.g. two or three) difference signals from said plurality of magnetic field components, and for deriving (e.g. calculating) said position (e.g. linear or angular position) from said plurality of (e.g. two or three) difference signals.

More specifically, in some embodiments (see e.g. FIG. 4 to FIG. 8, or FIG. 11 to FIG. 14), the sensor device is configured for measuring four magnetic field components, and for determining two pairwise-difference signals, and for determining said position as a function (e.g. an arctangent function) of a ratio of these difference signals. In other embodiments (see e.g. FIG. 9, FIG. 10, FIG. 15), the sensor device is configured for measuring three parallel magnetic field components, and for determining an average of these three values, and for determining three pairwise differences between each of the three measured components and the average component, resulting in a set of three-phase signals, and for applying a transformation (e.g. the Clarke transformation) for converting the three-phase signals into quadrature signals (typically denoted I and Q), and for determining said position as a function (e.g. an arctangent function) of a ratio of these quadrature signals.

It is a major advantage of such a system that the first and second difference signal are highly insensitive to an external magnetic disturbance field, and that therefore also the linear or angular position derived therefrom is highly insensitive to an external disturbance field.

It is an advantage that the first track and the second track are substantially 180° phase shifted, because such a magnet does not suffer from crosstalk between the tracks.

It is an advantage that the first and second sensor are located on the first and the second track respectively, because this allows their signals to be 180° phase shifted without having to space these sensors 1.0 pole pitch apart; or because this allows their signals to be 240° phase shifted without having to space these sensors 4/3 pole pitch apart.

In some embodiments (see e.g. FIG. 4 to FIG. 8B and FIG. 10 to FIG. 14B) where the first and the second sensor signal are 180° phase shifted, a difference between these signals provides approximately twice the signal amplitude (thus improving signal-to-noise), and cancels out (or largely reduces) an external disturbance field.

Referring now to the figures.

FIG. 1 shows an illustrative example of an angular position sensor system 100. The system comprises a magnetic source 102, and a sensor device 101 movable relative to the magnetic source, or vice versa. The magnetic source 102 comprises two circular tracks T1, T2 located in a plane. The first track T1 may also be referred to as the "inner track". The second track T2 may also be referred to as the "outer track". The first track T1 has a first width "w1". The second track T2 has a second width "w2". The first width w1 may be equal to the second width w2, but that is not absolutely required.

The first track T1 and the second track T2 are adjacent tracks. The first track T1 has a first centreline c1, a portion of which is shown in dashed line. The second track T2 has a second centreline c2. The first centreline c1 is a circle having a first radius, and the second centreline c2 is a concentric circle having a second radius. The distance "dt"

between the two centrelines c1, c2 is constant, and is referred to as the "track distance".

Such a magnetic source 102 can be constructed for example by producing two axially magnetized ring magnets, and then mechanically joining them, e.g. by glueing.

Another way of producing the magnetic source 102 is based on magnetising a magnetic material using a relatively strong electrical current (a technique known per se in the art, but not for this particular topology).

Another way of producing the magnetic source 102 is by using a technique for making bonded magnets. This technique is also known per sé, but not for this particular topology. Typically, a mixture known as "feed stock" containing magnetic particles is injected in a cavity of a mould, and one or more permanent magnets are located in close vicinity of, but outside the cavity during moulding.

In an embodiment, the magnetic source is made of an isotropic magnetic material, or entirely made of an isotropic magnetic material. The material can for example be or comprise Neodymium or Ferrite, but other isotropic magnetic materials can be used as well.

In an embodiment, the magnetic source is made of an anisotropic material.

In an embodiment, the magnetic source is made of SmCo, or FeNdB.

As a particular example, the magnetic source 102 may have a shape as illustrated in FIG. 1, with an outer diameter (of the outer track) of 14.0 mm, and an inner diameter (of the inner track) of 6.0 mm. The width of each track w1, w2 may be equal to 2.0 mm, and the thickness (or height) H may be 1.0 mm.

Each track may have for example 4 North poles and 4 South poles at its upper surface, thus each track may have eight magnetic poles at its upper surface, each pole spanning an angular range of 360°/8=45° (mechanical); or each track may have 12 magnetic poles at its upper surface, each spanning an angular range of 360°/12=30° (mechanical); or each track may have 16 magnetic poles, each spanning an angular range of 360/16=22.5° (mechanical).

In preferred embodiments, each track has at least four North poles and at least four South poles at its upper surface, or at least six North poles and at least six South poles at its upper surface, or at least eight North poles and at least eight South poles at its upper surface.

The sensor device 101 is configured for determining an angular position within that mechanical angular range. The higher the number of poles per track, the smaller the mechanical angular range, and the more sensitive the magnetic positioning system 100.

The sensor device 102 comprises a substrate with a plurality of magnetic sensors. The substrate may be a semiconductor substrate. The substrate may have a rectangular shape. The magnetic sensors may be arranged in various manners, for example as will be described in more detail in FIG. 4 to FIG. 10.

The sensor device is configured for moving at a predefined distance in the range from 0.5 mm to 5.0 mm from the magnetic source, or vice versa. The path of relative movement of the sensor device 101 is a circular path, having the same centre as the magnetic source.

FIG. 2 shows an illustrative example of an angular position sensor system 200, which can be seen as a variant of the position sensor system 100 of FIG. 1. Most of what has been described for the system 100 of FIG. 1 is also applicable here and will not be repeated. The main difference between the angular position sensor system 200 of FIG. 2 and the angular position sensor system 100 of FIG. 1 is that the tracks of the magnetic source 202 form a cylindrical surface. These tracks are preferably radially magnetized (in a direction perpendicular to the cylindrical surface). The sensor device 201 is arranged outside of the cylindrical surface. This position may also be referred to as "on the equator". The sensor device 201 may comprise any of the sensor arrangements described in FIG. 11 to FIG. 15. The sensor device 201 is preferably situated at a fixed distance (typically referred to as "air-gap") in the range from about 0.5 to about 5.0 mm from the magnetic source 202.

FIG. 3 shows an illustrative example of a linear position sensor system 300, which can be seen as a variant of the position sensor system 100 of FIG. 1, and as a variant of the position sensor system 200 of FIG. 2. The main difference between the linear position sensor system 300 of FIG. 3 and the angular position sensor system 100 of FIG. 1 is that the tracks T1, T2 of the magnetic source 302 are two straight tracks, located in a plane. These tracks are preferably magnetized in a direction Z perpendicular to said plane. The sensor device 301 is located above the plane, and the path of relative movement is a straight line oriented in the X-direction, indicated by the white arrow. The sensor device 301 may comprise any of the sensor arrangements described in FIG. 11 to FIG. 15. The sensor device is preferably situated at a fixed distance (typically referred to as "air-gap") in the range from about 0.5 to about 5.0 mm from the magnetic source 302.

FIG. 4 to FIG. 10 show various sensor arrangements, that may be used in the sensor device 101 of FIG. 1.

FIG. 4 illustrates a sensor arrangement having four sensing spots A, B, C, D, and also shows a possible position and/or orientation of these sensing spots relative to the magnetic source. The four sensing spots may be located at the corners of a diamond, or at the corners of a square. The sensor device (not explicitly shown in FIG. 4) would comprise four magnetic sensors, one at each of said sensor locations.

The sensor device is preferably oriented such that the sensor locations A and B are located on a virtual line that is radially oriented. The distance between the sensor locations A and B is not critical. It suffices that the first sensor location A is located above the first track T1, and the second sensor B is located above the second track T2. Since the polarity of the first track T1 and the second track T2 are opposite, the signals at location A and B are 180° phase shifted, hence a difference between these signals substantially doubles the amplitude of the measured magnetic field component, and substantially cancels a constant external disturbance field. The locations A and B may be located on the centrelines of the tracks, but that is not absolutely required. It is an advantage if the distance between A and B is smaller than the track distance "dt" (see FIG. 1), because it allows to reduce the size of the substrate.

The sensor locations C and D are preferably both located above the first track T1, or both located above the second track T2. Ideally, the sensor locations C and D are exactly 1.0 pole pitch away from each other (indicated by angle ψ), in which case the signals measured at location C and D are substantially 180° (electrically) phase shifted. In this case formula [1] or [2] shown in FIG. 4 can be used to calculate the angular position of the sensor device relative to the magnet. A first difference signal diff1 can be calculated between the signals obtained from the sensors located at A and B. The first difference signal diff1 behaves like a cosine. A second difference signal diff2 can be calculated between the signals obtained from the sensors located at C and D. The second difference signal diff2 behaves like a sine. Formula

[1] may be used if the amplitude of diff1 and diff2 is substantially the same. Formula [2] may be used if the amplitude of diff1 and diff2 are different. The value of K is a constant, which may be determined by simulation, or by performing a calibration, and may be stored in a non-volatile memory 2121 of the sensor device (see e.g. FIG. 21). The value of K may be chosen substantially equal to the ratio of the amplitude of diff1 and the amplitude of diff2.

It is however not required that the locations C and D are exactly 1.0 pole pitch away from each other. In case they are not spaced apart by 1.0 pole pitch, the angular position $\varphi$ may be calculated using formula [3]. The value of M and T are constants, which may be determined by simulation, or by performing a calibration, and may be stored in a non-volatile memory 2121 of the sensor device (see e.g. FIG. 21).

While not absolutely required, it is preferred that the points C and D are located on a virtual line segment C-D that is perpendicular to the virtual line segment A-B.

In a particular embodiment (referred to as Example 4A), the sensor arrangement comprises four horizontal Hall elements (not explicitly shown), one at each sensor location A, B, C, D. The signals provided by these Hall elements are indicative of a magnetic field component Bz oriented in the Z-direction at the respective location. By subtracting the signals provided by the sensor at A and the sensor at B, a first difference signal diff1 is obtained, which is proportional to (BzA−BzB), and behaves like a cosine-signal. By subtracting the signals provided by the sensor at C and the sensor at D, a second difference signal diff2 is obtained, which is proportional to (BzC−BzD), and behaves like a sine-signal.

In another embodiment (referred to as Example 4B), the sensor arrangement comprises four vertical Hall elements (not explicitly shown), one at each sensor location A, B, C, D, and oriented with their axis of maximum sensitivity in the X-direction, perpendicular to the line segment [AB]. The signals provided by these Hall elements are indicative of a magnetic field component Bx oriented in the X-direction at the respective location. By subtracting the signals provided by the sensor at A and the sensor at B, a first difference signal diff1 is obtained, which is proportional to (BxA−BxB), and behaves like a cosine-signal. By subtracting the signals provided by the sensor at C and the sensor at D, a second difference signal diff2 is obtained, which is proportional to (BxC−BxD), and behaves like a sine-signal.

It is noted that the value of $\varphi$ determined using the formulas [1] to [3] is also referred to as the "electrical angle". But the mechanical angle corresponding to this electrical angle is only a fraction of this electrical angle. For example, in the example of FIG. 1, the first track has 4 North poles and 4 South poles at its upper surface, and the mechanical angle $\varphi$mech can be calculated as the electrical angle $\varphi$ divided by 4.

Figure 16:
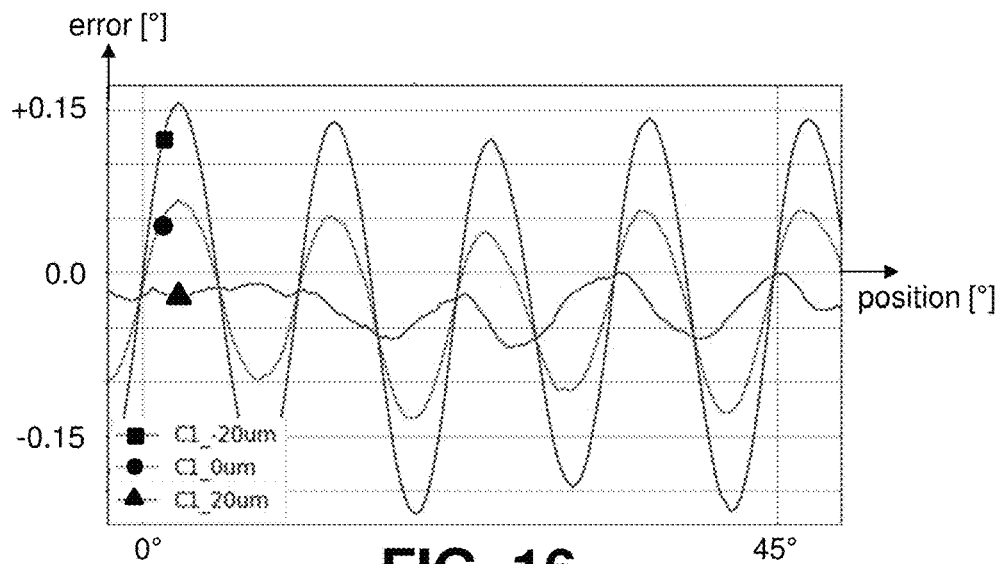
FIG. 16 shows a graph with three simulated curves; each curve illustrates an angular error as a function of the angular position of the sensor device relative to the magnetic source of a position sensor system as shown in FIG. 1 with a sensor arrangement as illustrated in FIG. 4. The three curves illustrate that the accuracy of the position sensor system is relatively high, but the angular error is somewhat sensitive to radial mounting offset.

FIG. 16 will illustrate simulation results of a sensor system comprising a magnetic source as shown in FIG. 1 and using four horizontal Hall elements arranged as illustrated in FIG. 4. As can be appreciated from FIG. 16, the angular error of such a system (without post-processing) is very small (e.g. within ±0.05°) when the sensor device is mounted at its intended position, but the maximum angular error slightly increases (to about ±0.20°) when the sensor device is inadvertently offset by ±20 µm from its original mounting position.

Optionally, an additional post-processing step may be applied, e.g. to further reduce the remaining error. This post-processing step may for example comprise a piecewise-linear approximation correction, or a look-up table, optionally with interpolation. Such post-processing techniques are known per se in the art, and hence need not be described in more detail here.

In a particular embodiment, the magnetic source has two circular tracks as illustrated in FIG. 1, and each track has a width of 2.0 mm, thus the centrelines are spaced apart by 2.0 mm. However, the distance between the points A and B may be a value smaller than the track distance, or larger than the track distance. For example, the distance between the points A and B may be a value in the range from 0.8 mm to 1.6 mm, or in the range from 1.0 mm to 1.4 mm, e.g. equal to about 1.2 mm. In a particular embodiment, the points A, B, C, D are located at the corners of a square having a side in the range from about 0.5 mm to about 1.1 mm, or in the range from about 0.6 mm to about 1.0 mm, e.g. equal to about 0.8 mm.

FIG. 5 illustrates another sensor arrangement 505 having four sensing spots A, B, C, D, and also shows a possible position and/or orientation of these sensing spots relative to the magnetic source. The sensor arrangement 505 of FIG. 5 can be seen as a variant of the sensor arrangement 405 of FIG. 4, the main difference being that the points D, A and C are located on a line segment which is perpendicular to the line segment A-B. The points D, C and B are located at the corners of a triangle. Preferably the point A is situated in the middle between points D and C. Everything else described for FIG. 4 is also applicable here, mutatis mutandis.

The same formulas as mentioned in FIG. 4 can also be used in this case. More specifically, in case the distance between the sensor locations C and D is substantially equal to 1.0 pole pitch (indicated by angle $\psi$), formula [1] may be used to determine the position of the sensor arrangement relative to the magnetic source. But that is not absolutely required, and the distance between the points C and D may also be larger or smaller than 1.0 pole pitch, and formula [2] or formula [3] may be used instead.

The same advantages of high accuracy (or high sensitivity), and high robustness against an external disturbance field, against temperature variations, against ageing effects, and against demagnetisation effects are also achieved when using the sensor arrangement 505 of FIG. 5.

FIG. 6 illustrates another sensor arrangement 605 having four sensing spots A, B, C, D, and a possible position and/or orientation of these sensing spots relative to the magnetic source. The sensor arrangement 605 of FIG. 6 can be seen as a variant of the sensor arrangement 505 of FIG. 5, the main difference being that the points D, B and C are located on a line segment which is perpendicular to the line segment A-B. The points D, C and A are located at the corners of a triangle. Preferably the point B is situated in the middle between points D and C. Everything else described for FIG. 5 is also applicable here, mutatis mutandis. The same formulas as mentioned in FIG. 4 can also be used in this case.

The same advantages of high accuracy (or high sensitivity), and high robustness against an external disturbance field, against temperature variations, against ageing effects, and against demagnetisation effects are also achieved when using the sensor arrangement 605 of FIG. 6.

FIG. 5 and FIG. 6 can be seen as two extreme cases, wherein the imaginary line segment containing the points C and D shifts from a position containing the point A ("on the left" in FIG. 5), to a position containing the point B ("on the right" in FIG. 6), but the present invention is not limited hereto, and the line segment containing the points C and D may also assume intermediate positions, meaning that the line segment C-D intersects the line segment A-B at a location between point A and point B.

FIG. 7 illustrates another sensor arrangement 705 having four sensing spots A, B, C, D, and shows a possible position and/or orientation of these sensing spots relative to the magnetic source. The sensor arrangement 705 of FIG. 7 can be seen as a variant of the sensor arrangement 505 of FIG. 5, the main difference being that the point C of FIG. 5 is now located on the inner track instead of the outer track, but is located at ½ pole pitch distance from point B. In this case, the four points A, B, C, D are located on a trapezium as illustrated in FIG. 7(c). Everything else described for FIG. 5 is also applicable here, mutatis mutandis. The same formulas as mentioned in FIG. 4 can also be used in this case, and the same advantages are also achieved.

Figure 17:
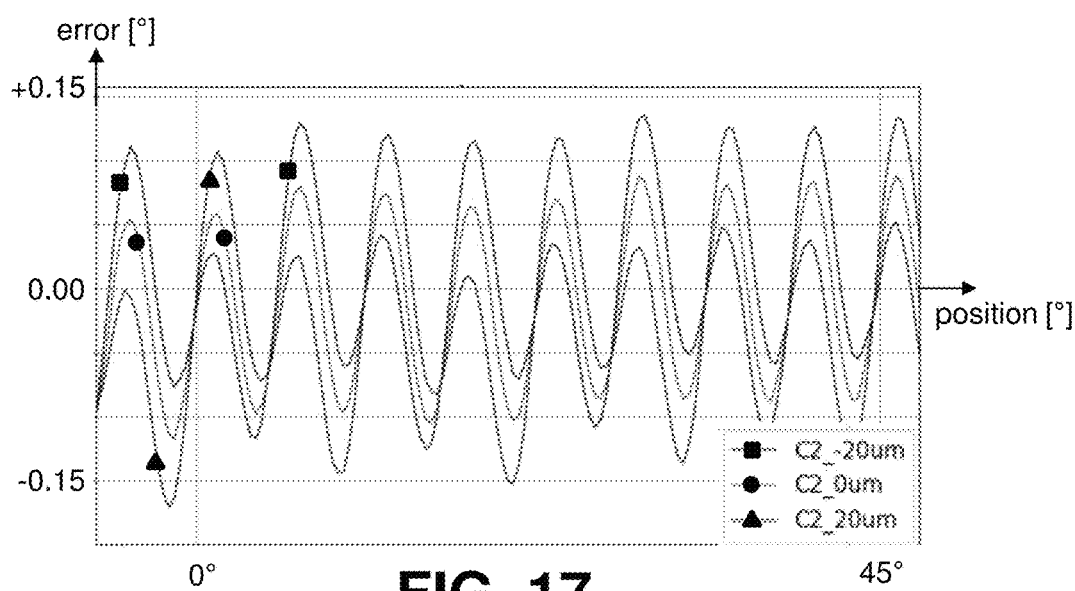
FIG. 17 shows a graph with three simulated curves; each curve illustrates an angular error as a function of the angular position of the sensor device relative to the magnetic source of a position sensor system as shown in FIG. 1 with a sensor arrangement as illustrated in FIG. 7. The three curves illustrate that the accuracy of the position sensor system is relatively high, but the angular error is somewhat sensitive to radial mounting offset.

FIG. 17 will illustrate simulation results of a sensor system comprising a magnetic source as shown in FIG. 1 and using four horizontal Hall elements arranged as illustrated in FIG. 7. As can be appreciated from FIG. 17, the angular error of such a system (without post-processing) is very small (e.g. within ±0.10°) when the sensor device is mounted at its intended position, but the maximum angular error slightly increases (to about ±0.20°) when the sensor device is inadvertently offset by ±20 μm from its original mounting position.

In a variant of FIG. 7, the four points A, B, C, D are located at the corners of a trapezoid or a truncated triangle as depicted in FIG. 7(a). If the sensor device is shifted such that the line segment C-D and the line segment A-B are radially oriented, the same formulas as presented in FIG. 4 can still be used, and similar results are expected.

In another variant of FIG. 7, the four points A, B, C, D are located on a rectangle, e.g. as depicted in FIG. 7(b). The same formulas as presented in FIG. 4 can still be used, but the angular error provided by the formulas [1] to [3] may increase as the distance between A and D, and/or the distance between C and B deviates from ½ pole pitch. Depending on the application, however, an error in the order of about ±5°) may still be allowed, especially taking into account that the mechanical angle is e.g. sixteen times smaller, if each tracks comprise 16 poles. It is noted that this error may be reduced by applying a post-processing step, e.g. by using a look-up table with interpolation, and/or by using a piecewise-linear approximation function.

FIG. 8A illustrates a sensor arrangement having only two sensing spots A and B, but at each sensing spot two orthogonal magnetic field components are measured, namely one field component Bx oriented in the circumferential direction X (i.e. tangential to an imaginary circle passing through the sensing spot), and one field component Bz oriented in the Z-direction, perpendicular to the surface of the magnetic source.

FIG. 8A also shows a possible position of these sensing spots relative to the magnetic source. The sensor arrangement is preferably oriented such that the sensor locations A and B are located on a virtual line which is radially oriented with respect to the centre of the magnetic source. The distance between the sensor locations A and B is not critical. If suffices that one sensor location (e.g. A) is located above the outer track, and the second sensor location (e.g. B) is located above the inner track.

Since the polarity of the first track T1 and the second track T2 are opposite, the signals measured at location A and B are 180° phase shifted, hence a difference between these signals substantially doubles the amplitude of the measured magnetic field components Bx and Bz, and substantially cancels a constant external disturbance field. The locations A and B may be located on the centrelines of the tracks, but that is not absolutely required. It is an advantage if the distance between A and B is smaller than the track distance "dt" (see FIG. 1), because it allows to reduce the size of the substrate.

Figure 20:
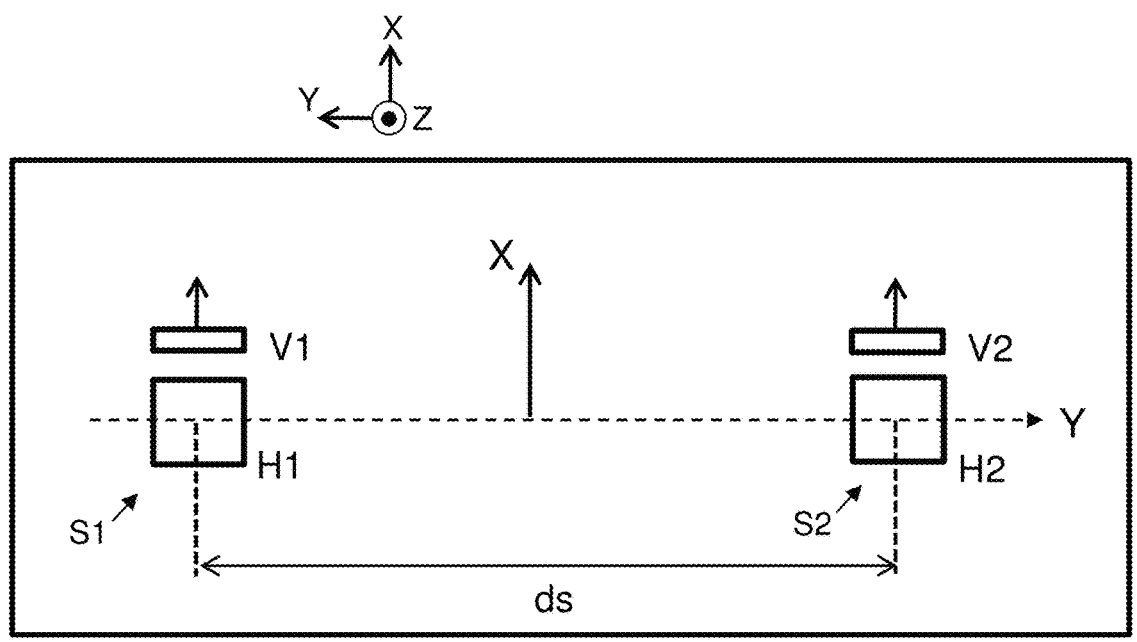
FIG. 20 shows an example of another sensor structure that may be used in the sensor arrangement of FIG. 8A and FIG. 14A.

The sensor arrangement is configured for measuring at location A: a magnetic field component BxA oriented in the X-direction, and a magnetic field component BzA oriented in the Z-direction, and for measuring at location B: a magnetic field component BxB oriented in the X-direction, and a magnetic field component BzB oriented in the Z-direction. Such measurement can be done for example by using a sensor structure as illustrated in FIG. 19, or as illustrated in FIG. 20, which will be explained further.

Referring back to FIG. 8A, by subtracting the signals BxA and BxB a first difference signal diff1 can be obtained which behaves like a cosine-signal, and by subtracting the signals BzA and BzB a second difference signal diff2 can be obtained, which behaves like a sine signal. If the amplitude of the two difference signals is the same, formula [1] can be applied to determine an angular position, namely: φ=arctan (R). If the amplitude of the difference signals is different, formula [2] can be applied, namely: φ=arctan(K*R), K being a predefined constant, which may be determined by simulation or by performing a calibration test, and which may be stored in a non-volatile memory of the sensor device (see e.g. FIG. 21). In both cases R=diff1/diff2.

Figure 18:
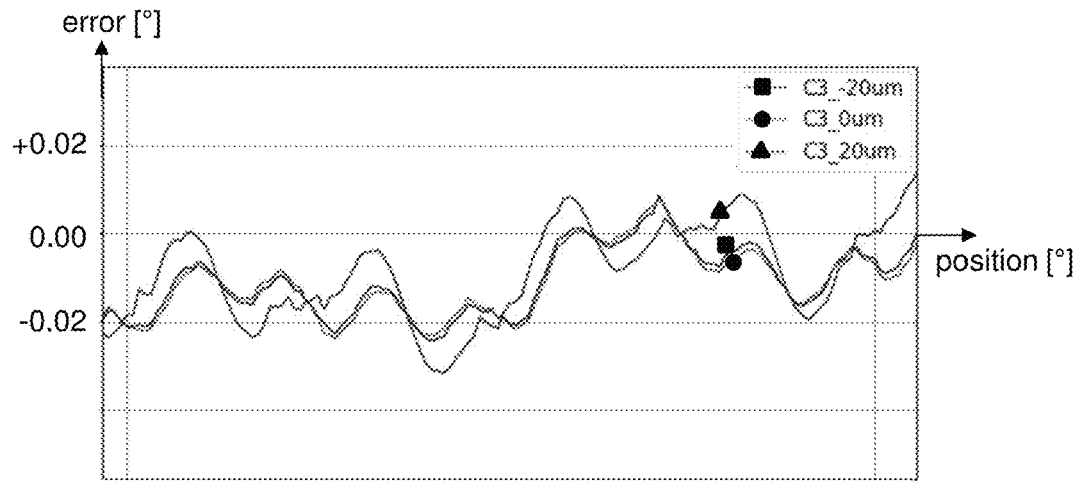
FIG. 18 shows a graph with three simulated curves; each curve illustrates an angular error as a function of the angular position of the sensor device relative to the magnetic source of a position sensor system as shown in FIG. 1 with a sensor arrangement as illustrated in FIG. 8. The three curves illustrate that the accuracy of the position sensor system is very high, and that the angular error is furthermore highly insensitive to radial mounting offset.

FIG. 18 will illustrate simulation results of a sensor system comprising a magnetic source as shown in FIG. 1 and using a sensor arrangement as shown in FIG. 19, arranged relative to the magnetic source as illustrated in FIG. 8A. As can be appreciated from FIG. 18, the angular error of such a system (without post-processing) is very small (e.g. within ±0.02°) when the sensor device is mounted at its intended position, but also when the sensor device is inadvertently offset by ±20 μm from its original mounting position, presumably because the signals Bx and Bz are 90° phase shifted when measured at the same location, irrespective of the pole pitch.

While an additional post-processing step may also be applied in this case, this can typically be omitted for most applications.

It is a major advantage of this embodiment that the sensor device can be highly compact, since it requires only two sensor locations, and the distance between them is highly independent of the dimensions of the magnetic source, not only the pole pitch, but also the track width, because, as mentioned above, it suffices that point A is located above the outer track and point B is located above the inner track, and because none of them needs to be located on the centreline of the track.

FIG. 8B illustrates a sensor arrangement 805b having four different sensing spots A, B, C, D located on a straight line, and wherein two of the sensing spots are located on the first track, and the two other sensing spots are located on the second track. The sensor arrangement 805a of FIG. 8B can be seen as a variant of the sensor arrangement 805a of FIG. 8A, in the sense that in both arrangements two magnetic field components Bx are measured and two magnetic field components Bz, but in case of FIG. 8A, the Bz components are measured at the same sensor location as the Bx component, whereas in case of FIG. 8B, the four magnetic field components are measured at four different locations. The same formulas as mentioned in FIG. 8A can also be used in this case, and the same advantages are also achieved. Preferably the arrangement of the sensor locations is symmetrical with respect to the transition between the first track and the second track, but that is not absolutely required. As already mentioned above, formula [1] can be used if the amplitude of the difference signals diff1, diff2 is the same, and formula [2] can be used if the amplitude of diff1 is different from the amplitude of diff2. A sensor arrangement slightly different from the one shown in FIG. 20, wherein for example the two vertical Hall elements are located between the two Horizontal Hall elements, or vice versa, may be used in this case. The distance between the four sensor locations is not critical, but the distance between the two inner sensor locations (C and D in FIG. 14B) is preferably at least 50% of the distance between the two outer sensor locations (A and B in FIG. 14B), preferably at least 60%, or at least 70%, or at least 80%, or at least 90%.

In an embodiment, Bx is measured at A and at B, and Bz is measured at C and at D.

In another embodiment, Bz is measured at A and at B, and Bx is measured at C and at D.

In another embodiment, Bx is measured at A and at D, and Bz is measured at C and at B.

In another embodiment, Bx is measured at C and at B, and Bz is measured at A and at D.

Figure 9:
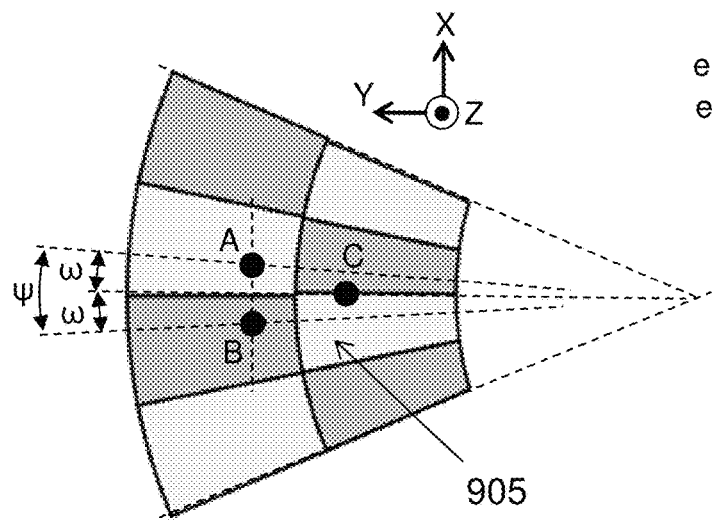

FIG. 9 illustrates a sensor arrangement 905 having only three sensing spots A, B and C. At each sensing spot one magnetic field component is measured, e.g. Bz oriented in the Z-direction, perpendicular to the substrate of the sensor device, and perpendicular to the surface of the magnetic source. FIG. 9 also shows a possible position of these sensing spots relative to the magnetic source.

As can be seen in FIG. 9, one sensor location (e.g. C) is located above one track, and the other sensor locations (e.g. A and B) are located above the other track.

Preferably the three sensor locations are located on an isosceles triangle. The isosceles triangle may be an equilateral triangle, but that is not required, and in preferred embodiments, the isosceles triangle is not an equilateral triangle. Preferably one of the sides (in the example shown in FIG. 9, the side A-B) is at least 10% shorter or at least 10% longer than the other sides.

In preferred embodiments, the distance between the sensing spots B and C is smaller than the track distance "dt". In a particular example, the track width w1, w2 of the first and of the second track is equal to 2.0 mm, and the distance between the locations B and C is a value in the range from 0.5 to 1.8 mm, or in the range from 0.6 to 1.6 mm, or in the range from 0.7 to 1.4 mm, e.g. equal to about 0.8 mm, or equal to about 1.0 mm, or equal to about 1.2 mm.

Preferably the sensing spots A and C are angularly spaced by ⅓ pole pitch (indicated by angle ω), and preferably the sensing spots C and B are angularly spaced by ⅓ pole pitch, and preferably the sensing spots A and B are angularly spaced by ⅔ pole pitch (indicated by angle ψ), such that the signals BzA, BzB, BzC measured at these locations are 120° phase shifted. Thus, in the absence of an external disturbance field, the measured signals are three-phase signals. Techniques for calculating an angular position of a three-phase signal are known in the art, and any such technique can be used to determine the angular position of the sensor device relative to the magnetic structure. For completeness, one such technique will be explained here.

In an embodiment, the average of the magnetic field components BzA, BzB, BzC is calculated, e.g. in accordance with the following formula:

$$Bzavg=(BzA+BzB+BzC)/3$$

where Bzavg is the average Bz-component, and BzA, BzB, BzC are the magnetic field components oriented in the Z-direction measured at the location A, B, C respectively.

Ideally, in the absence of an external disturbance field, this average Bzavg should be equal zero. In practice, the average will not be exactly equal to zero, e.g. due to one or more of: mounting tolerances, imperfections of the magnetic source, an external disturbance field, etc.

From the measured signals and from the average signal, three difference signals can be derived, e.g. in accordance with the following formulas:

$$diff1=(BzA-Bzavg)$$

$$diff2=(BzB-Bzavg)$$

$$diff3=(BzC-Bzavg)$$

Each of these difference signals behaves like a sinusoidal signal with a DC-value around zero. These difference signals are 120° phase shifted relative to one another, and together they form a three-phase signal. This three-phase signal can be converted into a two-phase signal, using known techniques, e.g. using the well-known Clarke transformation, resulting in two signals, referred to as I and Q. These signals are 90° phase shifted, and ideally have the same amplitude. Optionally an amplitude correction may be applied to the three-phase signals, or to the two-phase signals. The angular position φ of the sensor device relative to the magnetic source can then be calculated as a function of a ratio R of the signals I and Q, e.g. in accordance with the following formulas:

$$R=Q/I,$$

$$\varphi=\arctan(R)$$

As mentioned above, optionally, a post-processing step may be applied to further improve the result. Such post-processing step may comprise the use of a look-up-table, optionally with interpolation, or may comprise the use of a piecewise-linear-approximation function.

It is a major advantage that this sensor arrangement can be highly compact, and that the influence of an external disturbance field can be largely reduced, or even completely eliminated.

It is noted that a particular sensor device having specific dimensions may be used in combination with various magnet sources with a slightly varying number of poles and/or a slightly varying pole pitch and/or slightly varying track widths and/or slightly varying inner and outer diameter. Indeed, by shifting the sensor device radially inwards or outwards, it can be ensured that the distance between the sensor locations A and B is substantially equal to ⅔ pole pitch. This radial shift may have some impact on the amplitudes of the signals measured at A, B, C, but any amplitude variations can be corrected for in known manners, e.g. by multiplying the measured signals by a respective predefined constant, which may be determined by simulation or by calibration, and may be stored in a non-volatile memory 2121 of the sensor device (see e.g. FIG. 21).

In a variant of the sensor arrangement described above, the sensor device is configured for measuring three magnetic field components BxA, BxB, BxC oriented parallel to the substrate, e.g. in the X-direction, at the sensor locations A, B, C, respectively. The X-direction is parallel to the line segment A-B. In an embodiment, the sensor device comprises three vertical Hall elements, located on an isosceles triangle having three corners A, B, C, and having three sides [AB], [BC] and [CA]. The length of the side [AB] may be at least 10% shorter or at least 10% longer than each of the length of the side [AC] and the length of the side [BC]. Everything else described for FIG. 9 is also applicable here, mutatis mutandis. In another embodiment, the sensor device comprises at least three magneto-resistive (MR) elements, configured for measuring the three magnetic field components BxA, BxB, BxC.

Figure 10:
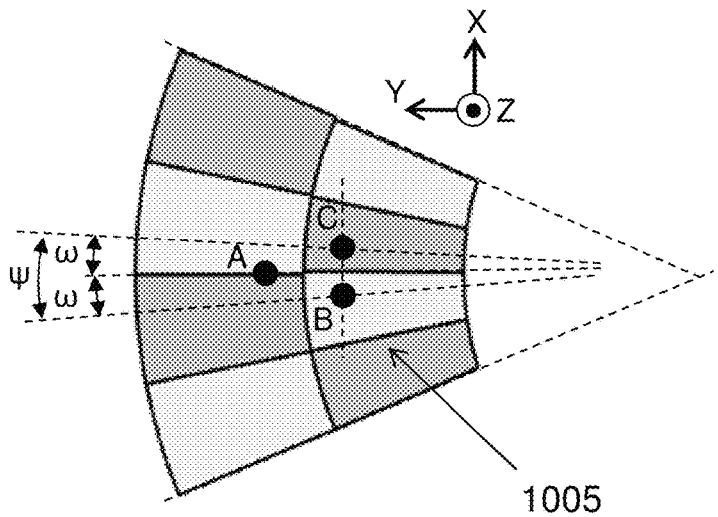

FIG. 10 illustrates a sensor arrangement 1005 which can be seen as a variant of the sensor arrangement 905 of FIG. 9. The main difference being that in this case one of the sensor spots (e.g. A) is located on the outer track, and the two other sensor spots (e.g. B and C) are located on the inner track. The main advantage hereof is that a sensor device having a sensor arrangement as shown in FIG. 10 can be even more compact than a sensor device having the sensor arrangement of FIG. 9, because the distance between the points B and C in FIG. 10 can be smaller than the distance between the points A and B of FIG. 9, while still being angularly spaced by ⅔ pole pitch (corresponding to 120° phase shift). Everything else described above for FIG. 9 is also applicable here.

In an embodiment, the sensor arrangement 1005 comprises three horizontal Hall elements for measuring BzA, BzB, BzC at the sensor locations A, B, C.

In a variant, the sensor arrangement 1005 comprises three vertical Hall elements, oriented with their axes of maximum sensitivity in the X-direction, configured for measuring three magnetic field components BxA, BxB, BxC at the sensor locations A, B, C respectively.

In another variant, the sensor arrangement 1005 comprises at least three magneto-resistive (MR) elements configured for measuring three magnetic field components BxA, BxB, BxC at the sensor locations A, B, C respectively.

A skilled reader will understand that a configuration as illustrated in FIG. 9 and a configuration as illustrated in FIG. 10, albeit with a slightly different magnet size and/or pole pitch, may be obtained by merely rotating the sensor device over 180° about the Z-axis. Or stated in other words, this means that a specific sensor device having specific dimensions and having a sensor arrangement as illustrated in FIG. 9 or FIG. 10 can be used for magnetic sources with various dimensions and/or pole pitches.

FIG. 11 to FIG. 15 show various sensor arrangements, as may be used in the sensor device 201, 301 of the systems 200, 300 shown in FIG. 2 and FIG. 3. The reader is reminded that the sensor arrangements of FIG. 4 to FIG. 10 can be used in combination with a magnetic source 102 as illustrated in FIG. 1, to form an angular position sensor system 100. Many of these sensor arrangements can also be used in combination with a magnetic source 202 as illustrated in FIG. 2, to form an angular position sensor system 200, or in combination with a magnetic source 302 as illustrated in FIG. 3, to form a linear position sensor system 300. Examples of such arrangements will now be illustrated in more detail in FIG. 11 to FIG. 15.

FIG. 11 shows a sensor arrangement 1105 comprising four sensor locations A, B, C, D similar to or identical to that of FIG. 4. Everything described above for the sensor arrangement 405 of FIG. 4 is also applicable here, mutatis mutandis, meaning for example, that the two tracks of FIG. 11 are straight instead of circular, and that the line segment A-B is oriented in a transverse direction instead of a radial direction.

The same formulas as presented in FIG. 4 are also applicable here. Preferably the distance between the points C and D is equal to 1.0 times the pole pitch, but in contrast to the arrangements shown in FIG. 4 to FIG. 10, the pole pitch of the magnetic source shown in FIG. 11 is fixed, and cannot be increased or decreased by shifting the sensor device in the lateral direction Y. In the case of the angular sensor system 200 of FIG. 2, where the sensor device 201 is mounted "on the equator", the pole pitch seen by the sensor device may be slightly increased or decreased with a varying air-gap. But as already described above, this can be addressed by using formula [2] or formula [3] instead of formula [1].

Furthermore, in case of a linear position sensor system (e.g. as shown in FIG. 3), the angle φ is typically converted into a linear distance X, e.g. by multiplying the angle φ with a constant L, e.g. in accordance with the following formula: X=L*φ, where X is the linear position, and L is a predefined constant. The value of L may be determined as the pole pitch (expressed in mm) divided by π (pi=about 3.1416). In order to obtain an absolute position, an integer (n) times the pole pitch may be added, in manners which are known per se in the art. This can be written mathematically as: X=L*φ+ n*pp, wherein pp is the pole pitch distance. The value of "n" may be determined dynamically (e.g. by counting, starting from a reference position), or may be determined using a second sensor system mechanically coupled to the first sensor system (see also FIG. 22).

As was the case in FIG. 4, the sensor arrangement 1105 may comprise four horizontal Hall elements for measuring BzA to BzD, or may comprise four vertical Hall elements for measuring BxA to BxD, or may comprise four MR elements for measuring BxA to BxD.

The simulation results of FIG. 16 are also applicable for the sensor configuration of FIG. 11, taking into account that only one of the curves will be applicable, namely the one for which the pole distance corresponds to the distance between the sensor spots C and D. But as explained above, any mismatch can be largely corrected by using formula [2] or formula [3].

FIG. 12 shows a sensor arrangement 1205 comprising four sensor locations A, B, C, D arranged in a similar manner as the sensor arrangement of FIG. 5 or FIG. 6. But the sensor arrangement 1205 of FIG. 12 can also be seen as a variant of the sensor arrangement 1105 of FIG. 11 in which the sensor spots C and D are laterally shifted towards point A. Everything else described for FIG. 5 and its variants, or FIG. 6 and its variants, or FIG. 11 and its variants is also applicable here, mutatis mutandis.

Figure 13:
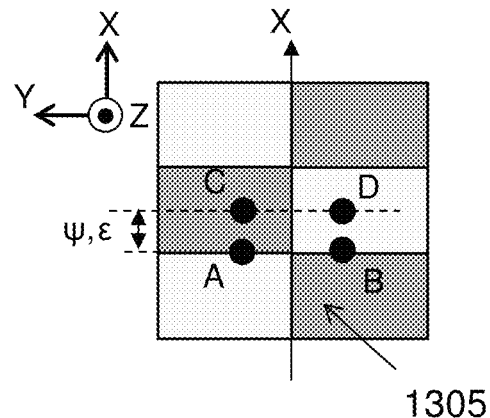

FIG. 13 shows a sensor arrangement 1305 comprising four sensor locations A, B, C, D arranged in a similar manner as the sensor arrangement 705 of FIG. 7, in particular FIG. 7(b). But the sensor arrangement 1305 of FIG. 13 can also be seen as a variant of the sensor arrangement 1105 of FIG. 11 in which the sensor spots C and D are shifted. Everything else described for FIG. 7 and its variants, or FIG. 11 and its variants is also applicable here, mutatis mutandis.

The simulation results of FIG. 17 are also applicable for the configuration of FIG. 13, taking into account that only one of the curves will be applicable, namely the one for which the pole distance corresponds to the distance between the sensor spots A and C (and between B and D). But as explained above, any mismatch can be largely corrected by using formula [2] or formula [3].

FIG. 14A shows a sensor arrangement 1405 comprising only two sensor locations A, B arranged in a similar manner as the sensor arrangement 805 of FIG. 8A. At each sensor location two magnetic field components are measured: Bx oriented in the X-direction, and Bz oriented in the Z-direction. The formulas shown in FIG. 14A are applicable. The sensor structure of FIG. 19 or FIG. 20 may be used, but of course, other sensor structures capable of measuring Bx and Bz at two locations A, B spaced apart in the Y-direction, may also be used.

Similar as was the case for FIG. 8A, the sensors do not need to be located exactly in the middle of the tracks but may be spaced apart by a distance "ds" smaller or larger than the track distance "dt".

In an illustrative example, the width w1 of the first track, and the width w2 of the second track is 2.0 mm, hence a distance "dt" between the centrelines and the tracks is also equal to 2.0 mm. Preferably, however, the distance "ds" between the sensor positions A, B is smaller than the track distance "dt", for example "ds" may be a value in the range from 0.5 mm to 1.8 mm, or in the range from 0.6 mm to 1.6 mm, e.g. equal to about 0.8 mm, or equal to about 1.0 mm, or equal to about 1.2 mm, or equal to about 1.4 mm. By choosing (ds<dt), e.g. ds being 20% to 90% of dt, the size of the substrate of the sensor device can be decreased.

It is a major advantage of this embodiment that the sensor device requires only two sensor locations, which can moreover be located relatively close together, in particular at a distance "ds" which is largely independent of the track distance "dt" and which is independent of the pole pitch "pp".

The simulation results of FIG. 18 are also applicable for the configuration of FIG. 14, taking into account that only one of the curves will be applicable, depending on a lateral shift (in the Y-direction).

FIG. 14B illustrates a sensor arrangement 1405*b* having four different sensing spots A, B, C, D located on a straight line, and wherein two of the sensing spots are located on the first track, and the two other sensing spots are located on the second track. The sensor arrangement 1405*b* of FIG. 14B can be seen as a variant of the sensor arrangement 805*a* of FIG. 8A, and as a variant of the sensor arrangement 1405*a* of FIG. 14A.

Figure 15:
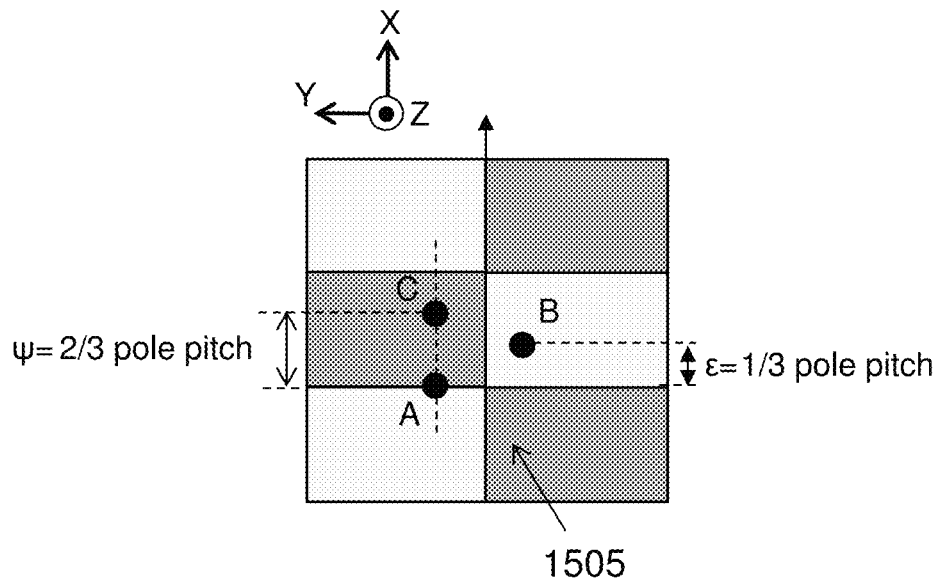

FIG. 15 shows a sensor arrangement 1505 comprising only three sensor locations A, B, C arranged in a similar manner as the sensor arrangement of FIG. 9 or FIG. 10. The sensor arrangement 1505 of FIG. 15 can also be seen as a variant of the sensor arrangement 1105 of FIG. 11, having only three sensor locations, wherein A and B, and B and C are spaced apart by ⅓ pole pitch, thus A and C are spaced apart by ⅔ pole pitch. The same formulas as provided for FIG. 9 are also applicable here.

FIG. 16 shows a graph with three simulated curves, obtained using a commercially available software simulation program COMSOL®. Each curve illustrates an angular error as a function of the angular position of the sensor device of a position sensor system 100 as shown in FIG. 1 comprising:

a magnetic source 102 shaped as illustrated in FIG. 1, with an inner diameter of 6.0 mm, and an outer diameter of 14.0 mm. The magnetic source is axially magnetized (in the Z-direction), and has two adjacent tracks, each track having a width of 2.0 mm, each track having 16 North poles and 16 South poles at its upper surface (facing the sensor device), spaced equidistantly, each magnetic pole having a pole pitch of 360°/32=11.25°. The magnetic source material may be or may comprise Alloy Powder Core Ferrite, with a magnetization of 220 kA/m;

and a sensor device 101 having a sensor arrangement 405 as illustrated in FIG. 4, comprising four horizontal Hall elements (or four pairs of Horizontal Hall elements connected in parallel or in series for improving the signal-to-noise ratio) configured for measuring Bz-components BzA, BzB, BzC, BzD at the four locations A, B, C, D situated at the corners of a virtual square having a diagonal of 1200 μm (thus having four sides of about 849 μm), and situated at an air-gap of about 0.5 mm above the tracks.

Each curve shows the simulated angular error (in degrees) as a function of the mechanical angular position φ of the magnetic source 102 relative to the sensor device 101, when using formula [1].

The curve with the black circle shows the simulated angular error (in degrees) in case the sensor device is mounted such that the points B and D are situated on an imaginary circle having a radius of 3.0 mm (inner diameter of 6.0 mm/2)+2.0 (width of inner track)+0.35 mm (radially outwards, towards the centreline of the outer track)=5.35 mm. In this position (referred to as "reference position" or "envisioned position", the difference signals diff1 and diff2 have the same amplitude, and thus are quadrature signals.

The curve with the black square shows the simulated angular error in case the sensor device is mounted at a position 20 μm radially inwards with respect to the "reference position".

The curve with the black triangle shows the simulated angular error in case the sensor device is mounted at a position 20 μm radially outwards with respect to the "reference position".

Considering that the angular error of a classical angular position sensor system using a two-pole ring magnet having the same inner and outer diameter would be approximately ±0.3° (over the envisioned temperature range and external influences), and assuming that the mounting error is smaller than ±20 μm, it can be understood that the solution proposed by the present invention is more accurate than existing systems.

FIG. 17 shows a graph with three simulated curves, representing the angular error of a position sensor system 100 as shown in FIG. 1, comprising the same magnetic source as described for FIG. 16, but comprising a sensor device having four horizontal Hall elements arranged on a rectangle as illustrated in FIG. 7(*b*), wherein the distance [AB]=[CD]=1200 μm, and the distance [AD]=[BC]=849 μm. The error of the curves of FIG. 17 is comparable to the error of the curves of FIG. 16.

FIG. 18 shows a graph with three simulated curves, representing the angular error of a position sensor system 100 as shown in FIG. 1, comprising the same magnetic source as described for FIG. 16, but comprising a sensor device having a sensor arrangement with two so called "2D magnetic pixels" arranged at spot A and B as illustrated in FIG. 8. This may be implemented for example using a sensor device as illustrated in FIG. 19 or as illustrated in FIG. 20. The simulation of FIG. 18 was performed for the sensor structure of FIG. 19, wherein each sensor comprises an integrated magnetic concentrator (IMC) disk having a diameter of about 190 μm, and two horizontal Hall elements arranged on opposite sides of the IMC disk. In the simulation of FIG. 18, the two sensor locations A, B were located on the centrelines of the tracks, hence were spaced apart in the Y-direction by a distance ds=2.0 mm.

The curve with the black circle shows the simulated angular error (in degrees) in case the sensor is mounted in a reference position wherein sensor spot A is spaced equally far from the outer radius as the sensor spot B is spaced from the inner radius. As can be seen, the maximum error is smaller than about ±0.03°, which is an improvement of about a factor 10 over the prior art.

The curve with the black square shows the simulated angular error in case the sensor device is mounted at a position 20 μm radially inwards with respect to the reference position. The curve with the black triangle shows the simulated angular error in case the sensor device is mounted at a position 20 µm radially outwards with respect to the reference position. As can be seen, the error remains more or less the same.

In addition to the advantages mentioned above (highly robust against ageing, temperature effects, and an external disturbance field), the sensor arrangement of FIG. 8A and FIG. 8B furthermore offers the advantage that the dimensions of the sensor device are independent from the pole pitch, and largely independent from the track width, and (last but not least) that the error is highly independent from the radial mounting position. It was found that the error is also highly independent from a tangential mounting position (i.e. shift in the X-direction), thus, the mounting requirements of a sensor device having a sensor arrangement as illustrated in FIG. 8A or FIG. 8B can be severely relaxed.

It is pointed out that the simulations of FIG. 16 to FIG. 18 are also indicative for the accuracy of the angular position sensor system 200 of FIG. 2, in combination with a sensor device 201 having a sensor arrangement as illustrated in FIG. 4 to FIG. 10; and is also indicative for the accuracy of the linear position sensor system 300 of FIG. 3, in combination with a sensor device 301 having a sensor arrangement as illustrated in FIG. 11 to FIG. 15.

As far as is known to the inventors, a magnetic source as illustrated in FIG. 1 to FIG. 3 are not known in the art.

Sensor devices having three or four horizontal Hall elements, or having three or four vertical Hall elements, or having three or four magneto-resistive elements, for measuring three or four magnetic field components oriented in parallel at three or four sensor locations are known in the art, and hence need not be described in more detail here.

The sensor arrangements of FIG. 8A and FIG. 14A, however, contain two 2D-magnetic pixels, and may need some more explanation. Two possible embodiments are provided below, but the present invention is not limited thereto, and other sensor structures capable of measuring two orthogonal magnetic field components (e.g. Bx parallel to the substrate, and Bz perpendicular to the substrate) at two different locations spaced apart in the Y-direction, can also be used.

FIG. 19 shows an example of a sensor structure that may be used in the sensor arrangement of FIG. 8A and FIG. 14A. The sensor structure of FIG. 19 comprises two sensors S1 and S2. Each sensor is a "2D magnetic pixel" and comprises an integrated magnetic concentrator (IMC) and two horizontal Hall elements arranged at the periphery of the IMC disk. As can be seen, the IMC disks are spaced apart along the Y-direction, and the two horizontal Hall elements are spaced apart along the X-direction. In envisioned applications, the distance "ds" between centres of the IMC disks may be a value in the range from 500 µm to 3000 µm, but preferably in the range from 600 µm to 2500 µm, or in the range from 600 µm to 2000 µm, or in the range from 700 µm to 1600 µm. Assuming the signals provided by the Hall element H1, H2, H3, H4 are referred to as h1, h2, h3, h4 respectively, the Bz-component measured by the first sensor S1 is proportional to (h1+h2), the Bx component measured by the first sensor S1 is proportional to (h1−h2), the Bz-component measured by the second sensor S2 is proportional to (h3+h4), and the Bx component measured by the second sensor S2 is proportional to (h3−h4). If abstraction is made of the signal scaling, (which needs to be done anyway), it can be written that Bz1=(h1+h2), Bx1=(h1−h2), Bz2=(h3+h4) and Bx2=(h3h4). In the arrangement of FIG. 8A and FIG. 14A, a first difference ΔBx is calculated of the Bx1 and Bx2 component, and a second difference ΔBz is calculated of the Bz1 and Bz2 component. As mentioned in FIG. 8A and in FIG. 14A, an angular (and optionally a linear) position can be derived from a ratio of these difference signals.

In a variant of FIG. 19 (not explicitly shown), instead of four individual Hall elements H1, H2, H3, H4, four pairs of two adjacent Hall elements, connected in parallel or in series, can be used. A first pair would contain two horizontal Hall elements located substantially at the same location as H1 of FIG. 19, a second pair would contain two horizontal Hall elements located substantially at the same location as H2 of FIG. 19, etc. By doing so, the signal-to-noise ratio of the measured magnetic field components can be improved.

FIG. 20 shows an example of another sensor structure that may be used in the sensor arrangement of FIG. 8A and FIG. 14A. The sensor structure of FIG. 20 comprises two sensors S1 and S2 spaced apart along the Y-direction. Each sensor comprises a horizontal Hall element (e.g. H1), and a vertical Hall element (e.g. V1) oriented with its axis of maximum sensitivity in the X-direction. In envisioned applications, the distance "ds" between centres of the horizontal Hall elements may be a value in the range from 500 µm to 3000 µm, but preferably in the range from 600 µm to 2500 µm, or in the range from 600 µm to 2000 µm, or in the range from 700 µm to 1600 µm. Assuming the signals provided by Hall element H1, H2 are referred to as h1, h2, and the signals provided by the vertical Hall elements V1, V2 are referred to as v1, v2, and making abstraction of the scaling, the Bx and the Bz-component measured by the first sensor S1 can be written as Bx1=v1; Bz1=h1. Likewise, the Bx and Bz component measured by the second sensor S2 can be written as Bx2=v2; Bz2=h2. From these signals, two difference signals ΔBx, ΔBz can be determined, and an angular (and optionally a linear) position can be derived from a ratio of these difference signals.

In a variant of FIG. 20 (not explicitly shown), each of the sensors S1, S2 contains two vertical Hall elements (instead of only one), located on opposite sides of the Hall element. Or stated in other words, in this embodiment, the horizontal Hall element is located between the two vertical Hall elements, and the signals obtained from the two vertical Hall elements would be added or averaged. In this way a more accurate value for Bx can be obtained.

In another variant (described in relation to FIG. 8B and FIG. 14B), the sensor device also comprises two horizontal Hall elements, and two vertical Hall elements, but they are located at four different sensor locations located on a straight line. In an embodiment, the two horizontal Hall plates may be the outer sensor elements, spaced apart by "ds", and the two vertical Hall plates may be located between the two horizontal Hall plates. In another embodiment, the two vertical Hall plates may be the outer sensor elements, spaced apart by "ds", and the two horizontal Hall plates may be located between the two vertical Hall plates. Other variants are also possible.

Figure 21:
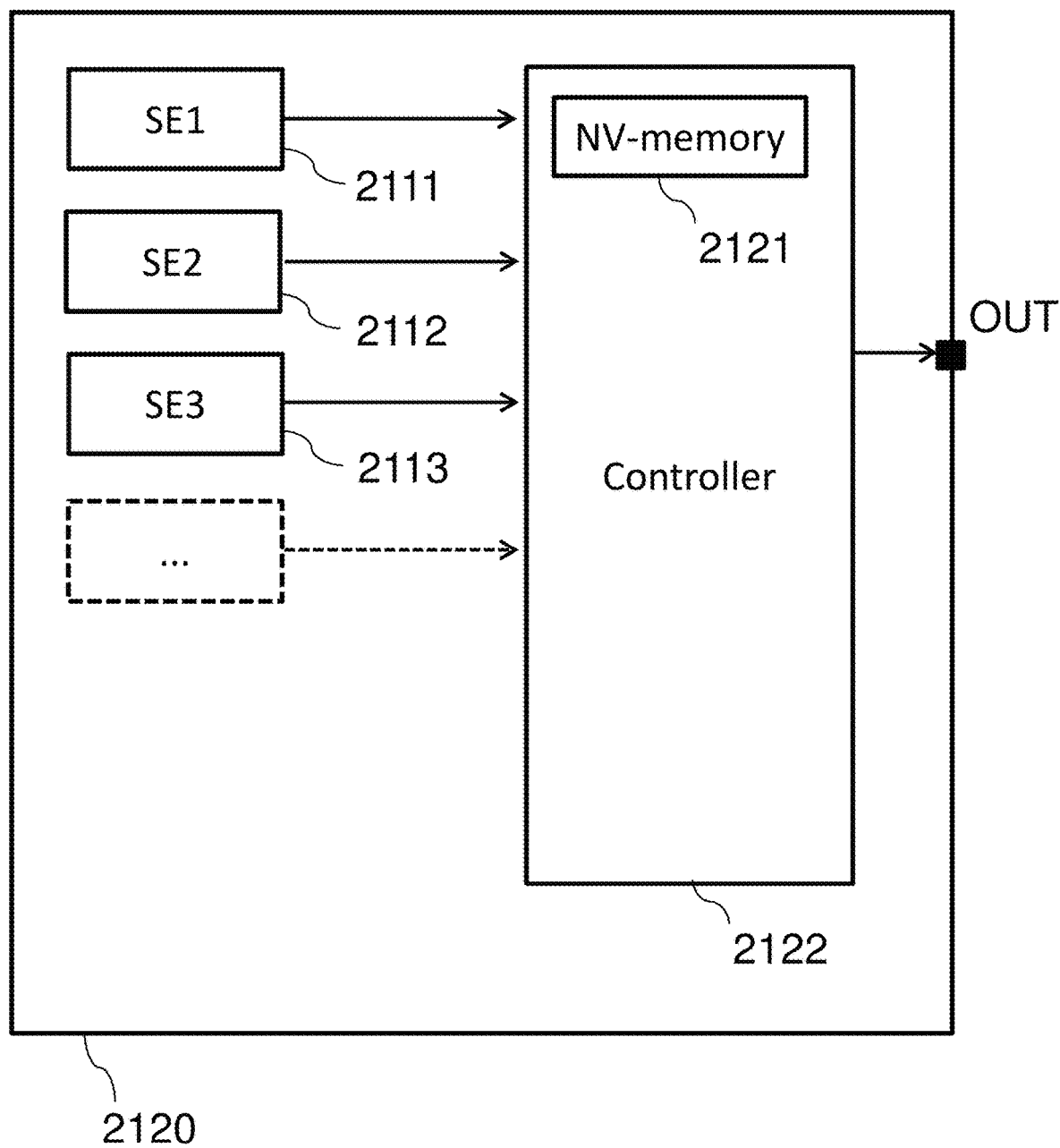
FIG. 21 shows a high-level block-diagram of a sensor device as may be used in the systems of FIG. 1 to FIG. 3.

FIG. 21 shows a high-level block-diagram of a sensor device 2120 as may be used in embodiments of the present invention. A brief description of possible hardware is provided here for completeness.

The position sensor device 2120 comprises a plurality of magnetic sensor elements SE1 to SE3 (e.g. three horizontal Hall elements arranged as illustrated in FIG. 9, or four horizontal Hall elements arranged as illustrated in FIG. 4, or two horizontal and two vertical Hall elements as illustrated in FIG. 20, etc.). While not explicitly shown, the sensor device 2120 typically also comprises biasing circuitry, readout circuitry, one or more amplifiers, analog-to-digital convertors (ADC), etc. Such circuits are well known in the art and are not the main focus of the present invention.

The position sensor device 2120 further comprises a processing circuit 2122, for example a programmable processing unit configured for receiving signals from the sensor elements, or signals derived therefrom (e.g. after amplification and digitization), and configured for determining an angular and/or a linear position in a manner as described above, e.g. in accordance with the formulas provided in FIG. 4 to FIG. 15. The linear or angular position may be provided at an output of the device, e.g. in a digital or analog manner.

The position sensor device 2120 may comprise a non-volatile memory 2121, which may comprise computer executable instructions for obtaining and processing the sensor signals. The non-volatile memory 2121 may also comprise one or more constants, such as the constant "K" for use in formula [2], or the constants "M" and "T" for use in formula [3], or the constant "L" for use in formula [4] but may of course also contain other information.

Figure 22:
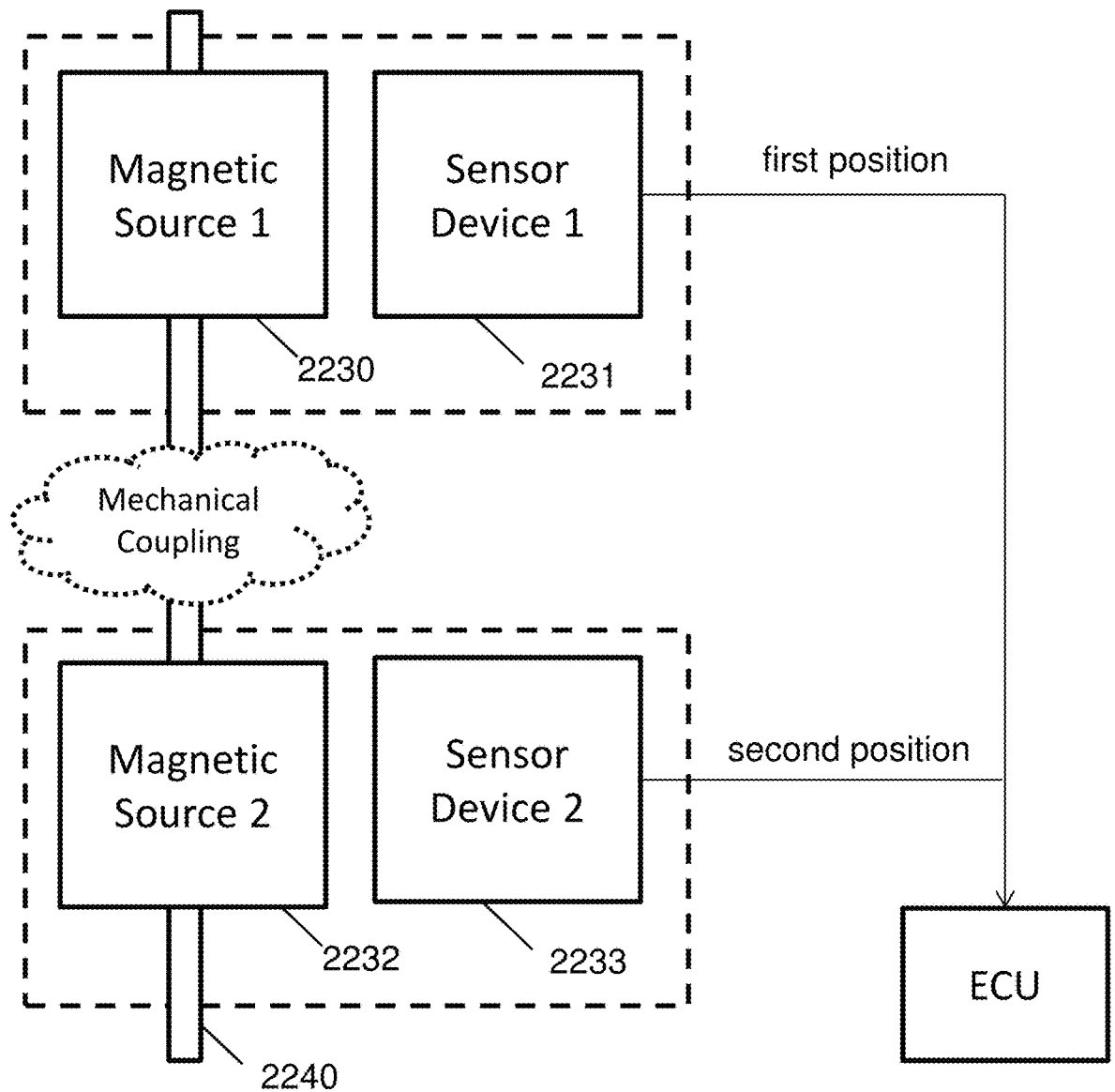
FIG. 22 shows a block-diagram of a position sensor system comprising a position sensor system as illustrated in FIG. 1 to FIG. 3 comprising a magnetic source with a dual track for determining a fine position, and comprising a classical position sensor system for determining a coarse signal, and further comprising a processor (e.g. ECU) for combining the fine and the coarse signal into a highly accurate absolute position.

FIG. 22 shows a block-diagram of a position sensor system 2200 comprising a first and a second subsystem.

The first subsystem comprises a first magnetic source 2230 with a dual track (e.g. as illustrated in FIG. 1 to FIG. 3) and a first position sensor device 2231, and is configured for providing a first position which is highly accurate (e.g. having an error smaller than ±0.15°), but which has only a relatively small measurement range (e.g. a range of 360°/16=22.5°.

An "actual mechanical angle" may be calculated as the sum of the angle φ determined as described above, and an integer times the angular range. Likewise, an "actual mechanical linear position" may be calculated as the sum of the position X described above, and an integer times the linear pole pitch. The value of this integer may be determined dynamically (e.g. by counting, starting from a known position), or may be determined by using a second position sensor system, which is mechanically coupled to the first subsystem, e.g. directly by using a common shaft, or indirectly using a gear mechanism, or in another suitable manner. It is noted that the angular position to be determined may be a value outside the range from 0° to 360°, e.g. in case of a multi-turn system, e.g. a steering wheel.

The second subsystem comprises a second magnetic source 2232 in the form of a two-pole magnet and a second position sensor device 2233, and configured for providing a second position which is less accurate but spanning a 360° angular range.

The position sensor system 2200 of FIG. 22 further comprises an external processor (e.g. an electronic control unit, ECU), communicatively connected to the first and second sensor device 2231, 2233, and is configured for combining the two signals, thereby generating a highly accurate position sensor signal having a relatively large range, e.g. spanning a range of 360° or larger than 360°. Algorithms for combining such signals are known in the art, and hence need not be explained in more detail here.

In an embodiment, the first magnetic source 2230 and the second magnetic source 2232 are mechanically connected via a common shaft 2240. In FIG. 22, the shaft is illustrated as a through-shaft for both subsystems, but that is not absolutely required, and any of the first and the second magnetic source may be mounted at one end of the shaft.

In another embodiment, the first magnetic source 2230 and the second magnetic source 2232 are mechanically connected via a gearbox.

In a variant of the system of FIG. 22, there is no external processor (ECU), but the first sensor device 2231 is configured to provide its output signal to the second sensor device 2233, and the second sensor device is furthermore configured for combining the two signals.

The invention claimed is:

1. A position sensor system for determining a position of a sensor device movable along a predefined path relative to a magnetic source, or vice versa, the position sensor system comprising:
    said magnetic source comprising a first plurality of alternating magnetic poles arranged along a first track, and comprising a second plurality of alternating magnetic poles arranged along a second track,
    wherein centres of the magnetic poles are spaced apart by a predefined pole pitch;
    wherein a centreline of the first track is spaced from a centreline of the second track by a predefined track distance, and
    wherein the magnetization of the first track and the magnetization of the second track are substantially 180° phase shifted; and
    wherein the second plurality is equal to the first plurality;
    said sensor device comprising a substrate with a plurality of magnetic sensors spanning a distance along the predefined path which is smaller than 1.40 times the pole pitch, the substrate oriented parallel or tangential to a surface of the magnetic source;
    wherein the plurality of magnetic sensors are configured for measuring a plurality of magnetic field components, including:
        a first magnetic field component oriented parallel to the substrate at a first sensor location located above the first track,
        a second magnetic field component parallel to the first magnetic field component at a second sensor location located above the second track,
        a third magnetic field component oriented perpendicular to the substrate at the first sensor location or at a third sensor location located above the first track,
        a fourth magnetic field component oriented perpendicular to the substrate at the second sensor location or at a fourth sensor location located above the second track;
    the sensor device being further configured for deriving a plurality of difference signals from said plurality of magnetic field components, and for deriving said position from said plurality of difference signals.

2. The position sensor system according to claim 1, wherein the first track has a first width in the range from 1.0 to 3.0 mm; and
    wherein the second track has a second width in the range from 1.0 to 3.0 mm; and
    wherein a distance between the first sensor location and the second sensor location is a value in the range from 1.0 mm to 3.0 mm.

3. The position sensor system according to claim 1, wherein each of the predefined path, the first track and the second track is linear.

4. The position sensor system according to claim 1, wherein the first track and the second track have a circular or annular shape with a common centre, and wherein the sensor device is located at a non-zero-distance from said centre.

5. The position sensor system according to claim 1, wherein the first and the second magnetic field components are oriented in a direction tangential to a centerline of the first and the second track.

6. The position sensor system according to claim 1, wherein the plurality of magnetic sensors are incorporated in the substrate or are mounted to the substrate.

7. The position sensor system according to claim 1, wherein the surface of the magnetic source is a planar surface, and the sensor device is mounted at a distance in a range from 0.5 to 5.0 mm above the planar surface; or
wherein the surface of the magnetic source is a cylindrical surface, and the sensor device is mounted at a distance in a range from 0.5 to 5.0 mm above the cylindrical surface.

8. The position sensor system according to claim 1, wherein the sensor device comprises two 2D magnetic sensors, each comprising an integrated magnetic flux concentrator and two horizontal hall elements; or
wherein the sensor device comprises two 2D magnetic sensors, each comprising a horizontal hall element and a vertical hall element.

9. The position sensor system according to claim 1, wherein the plurality of difference signals comprises a first difference signal determined from the first and the second magnetic field component and a second difference signal determined from the third and the fourth magnetic field component; and
wherein the position is determined as a function of the ratio of the first and the second difference signal.

10. The position sensor system according to claim 9, wherein the position is determined in accordance with one of the following formulas:

$$\varphi = \arctan(R), \text{ or}$$

$$\varphi = \arctan(K*R), \text{ or}$$

$$\varphi = \arctan(R/M \pm T),$$

where diff1 is the first difference signal, diff2 is the second difference signal, R is a ratio of the first and the second difference signal, and K and M are predefined constants different from 1.0; and
wherein T is a predefined constant different from 0, e.g. having an absolute value of at least 0.05.

11. The position sensor system according to claim 1, wherein the magnetic source is mounted to a shaft, and wherein the sensor device is configured for determining a first angular value of the shaft; and
wherein the position sensor system further comprises a two-pole magnet mechanically connected to said shaft, directly or indirectly, and further comprises a second sensor device configured for determining a second angular position of the shaft; and
wherein the position sensor system is further configured for combining the first angular position and the second angular position.

12. The position sensor system according to claim 1, wherein a distance between the first sensor location and the second sensor location is smaller than a sum of the width of the first track and the width of the second track, or smaller than 80% of said sum; or
wherein a distance between the first sensor location and the second sensor location is smaller than 2.00 times the track distance.

13. A position sensor system for determining a position of a sensor device movable along a predefined path relative to a magnetic source, or vice versa, the position sensor system comprising:
said magnetic source comprising a first plurality of alternating magnetic poles arranged along a first track, and comprising a second plurality of alternating magnetic poles arranged along a second track,
wherein centres of the magnetic poles are spaced apart by a predefined pole pitch;
wherein a centreline of the first track is spaced from a centreline of the second track by a predefined track distance, and
wherein the magnetization of the first track and the magnetization of the second track are substantially 180° phase shifted; and
wherein the second plurality is equal to the first plurality;
wherein the sensor device comprises a plurality of magnetic sensors spanning a distance along the predefined path which is smaller than 1.40 times the pole pitch;
wherein the plurality of magnetic sensors are configured for measuring a plurality of magnetic field components, including a first magnetic field component at a first sensor location located above the first track, and a second magnetic field component parallel to the first magnetic field component at a second sensor location located above the second track;
the sensor device being further configured for deriving a plurality of difference signals from said plurality of magnetic field components, and for deriving said position from said plurality of difference signals;
wherein the sensor device is further configured for measuring a third magnetic field component parallel to the first magnetic field component at a third sensor location;
wherein the first and the second sensor location are spaced apart by ⅓ pole pitch, and wherein the first and the third sensor location are spaced apart by ⅔ pole pitch; and
wherein the sensor device is configured for:
determining an average of the first, the second and the third magnetic field component; and for
determining a first difference signal as a difference between the first magnetic field component and said average; and for
determining a second difference signal as a difference between the second magnetic field component and said average; and for
determining a third difference signal as a difference between the third magnetic field component and said average; and for
determining the position based on the first, the second and the third difference signal.

14. A position sensor system for determining a position of a sensor device movable along a predefined path relative to a magnetic source, or vice versa, the position sensor system comprising:
said magnetic source comprising a first plurality of alternating magnetic poles arranged along a first track, and comprising a second plurality of alternating magnetic poles arranged along a second track,
wherein centres of the magnetic poles are spaced apart by a predefined pole pitch;
wherein a centreline of the first track is spaced from a centreline of the second track by a predefined track distance, and wherein the magnetization of the first track and the magnetization of the second track are substantially 180° phase shifted; and wherein the second plurality is equal to the first plurality;

wherein the sensor device comprises a plurality of magnetic sensors spanning a distance along the predefined path which is smaller than 1.40 times the pole pitch;

wherein the plurality of magnetic sensors are configured for measuring a plurality of magnetic field components, including a first magnetic field component at a first sensor location located above the first track, and a second magnetic field component parallel to the first magnetic field component at a second sensor location located above the second track;

the sensor device being further configured for deriving a plurality of difference signals from said plurality of magnetic field components, and for deriving said position from said plurality of difference signals;

the sensor device comprising a substrate, the substrate comprising: a first magnetic sensor for measuring a first magnetic field component at a first sensor position, and a second magnetic sensor for measuring a second magnetic field component at a second sensor position, and a third magnetic sensor for measuring a third magnetic field component at a third sensor position;

wherein the first, the second and the third magnetic field component are parallel, and are oriented in a direction parallel or perpendicular to the substrate;

wherein the first, the second and the third magnetic sensor are located at the corners of a triangle having a first side and a second side which are equal in length, and having a third side which is at least 10% longer or at least 10% shorter than the first and the second side;

the position sensor device further comprising a processing unit configured for determining an average of the first and the second and the third magnetic field component, and for determining a first difference signal as a difference between the first magnetic field component and the average, and a second difference signal as a difference between the second magnetic field component and the average, and a third difference signal as a difference between the third magnetic field component and the average; and for converting these three difference signals into quadrature signals, and for calculating an angular position based on these quadrature signals.

\* \* \* \* \*